(12) United States Patent
Takagi et al.

(10) Patent No.: US 7,075,527 B2
(45) Date of Patent: Jul. 11, 2006

(54) INPUT DEVICE OF ROTATIONAL OPERATION QUANTITY AND OPERATING DEVICE USING THIS

(75) Inventors: Shigeo Takagi, Ageo (JP); Nobumitsu Taniguchi, Ageo (JP); Kazuhiro Okada, Ageo (JP)

(73) Assignee: Wacoh Corporation, Saitama (JP)

( * ) Notice: Subject to any disclaimer, the term of this patent is extended or adjusted under 35 U.S.C. 154(b) by 316 days.

(21) Appl. No.: 10/619,965

(22) Filed: Jul. 15, 2003

(65) Prior Publication Data

US 2004/0052016 A1    Mar. 18, 2004

(30) Foreign Application Priority Data

Aug. 26, 2002  (JP) ............................. 2002-244995

(51) Int. Cl.
*G09G 5/00* (2006.01)

(52) U.S. Cl. ...................................... 345/184; 345/156

(58) Field of Classification Search ........ 345/156–167, 345/173–179, 184, 679, 680–681, 773
See application file for complete search history.

(56) References Cited

U.S. PATENT DOCUMENTS

| | | | |
|---|---|---|---|
| 4,793,193 A | 12/1988 | Borgudd | |
| 4,905,523 A | 3/1990 | Okada | 73/862.04 |
| 4,967,605 A | 11/1990 | Okada | 73/862.04 |
| 4,969,366 A | 11/1990 | Okada | 73/862.08 |
| 5,014,415 A | 5/1991 | Okada | 29/621.1 |
| 5,035,148 A | 7/1991 | Okada | 73/862.04 |
| 5,092,645 A | 3/1992 | Okada | 294/86.4 |
| 5,182,515 A | 1/1993 | Okada | 324/259 |
| 5,263,375 A | 11/1993 | Okada | 73/862.042 |
| 5,295,386 A | 3/1994 | Okada | 73/1 D |
| 5,343,765 A | 9/1994 | Okada | 73/862.043 |
| 5,365,799 A | 11/1994 | Okada | 73/862.041 |
| 5,392,658 A | 2/1995 | Okada | 73/862.043 |
| 5,406,848 A | 4/1995 | Okada | 73/517 R |
| 5,421,213 A | 6/1995 | Okada | 73/862.043 |
| 5,437,196 A | 8/1995 | Okada | 73/862.043 |
| 5,440,237 A | 8/1995 | Brown et al. | |
| 5,492,020 A | 2/1996 | Okada | 73/862.626 |
| 5,497,668 A | 3/1996 | Okada | 73/862.626 |
| 5,531,002 A | 7/1996 | Okada | 29/25.41 |
| 5,531,092 A | 7/1996 | Okada | 73/1 D |

(Continued)

FOREIGN PATENT DOCUMENTS

JP    2001/311671    11/2001

(Continued)

*Primary Examiner*—Ricardo Osorio
*Assistant Examiner*—Mansour M. Said
(74) *Attorney, Agent, or Firm*—Ladas and Parry LLP

(57) ABSTRACT

An efficient rotational-operation-quantity input device suitable to be built into a small electrical appliance is provided. An operational force applied by an operator is input in time series as a coordinate value (x, y) in an XY two-dimensional rectangular coordinate system by a two-dimensional force sensor 100, and is converted into a coordinate value (r, θ) by a polar-coordinate converting section 200. When a value r of the coordinate value (r, θ) obtained in time series is larger than a predetermined threshold rt, an operation-quantity recognizing section 300 recognizes the coordinate value (r, θ) as a significant coordinate value, and, when the value θ generates a variation Δθ exceeding a predetermined threshold θt with respect to a value "θ before" immediately therebefore during a period during which a significant coordinate value (r, θ) is obtained continuously, it recognizes a value corresponding to the variation Δθ as an operation quantity indicating a rotation.

21 Claims, 14 Drawing Sheets

U.S. PATENT DOCUMENTS

| | | | |
|---|---|---|---|
| 5,571,972 A | 11/1996 | Okada | 73/862.043 |
| 5,639,973 A | 6/1997 | Okada | 73/862.043 |
| 5,646,346 A | 7/1997 | Okada | 73/504.04 |
| 5,668,318 A | 9/1997 | Okada | 73/504.11 |
| 5,682,000 A | 10/1997 | Okada | 73/862.043 |
| 5,744,718 A | 4/1998 | Okada | 73/514.33 |
| 5,780,749 A | 7/1998 | Okada | 73/862.043 |
| 5,811,693 A | 9/1998 | Okada | 73/862.043 |
| 5,831,163 A | 11/1998 | Okada | 73/504.12 |
| 5,850,040 A | 12/1998 | Okada | 73/504.04 |
| 5,856,620 A | 1/1999 | Okada | 73/514.32 |
| 5,912,612 A | 6/1999 | Devolpi | |
| 5,948,990 A | 9/1999 | Hashida | |
| 5,949,354 A | 9/1999 | Chang | |
| 5,962,787 A | 10/1999 | Okada et al. | 73/514.32 |
| 5,987,985 A | 11/1999 | Okada | 73/504.04 |
| 6,003,371 A | 12/1999 | Okada | 73/504.02 |
| 6,053,057 A | 4/2000 | Okada | 73/862.043 |
| 6,076,401 A | 6/2000 | Okada | 73/504.12 |
| 6,087,925 A | 7/2000 | Devolpi | |
| 6,098,461 A | 8/2000 | Okada | 73/514.34 |
| 6,158,291 A | 12/2000 | Okada | 73/862.043 |
| 6,159,761 A | 12/2000 | Okada | 438/53 |
| 6,185,814 B1 | 2/2001 | Okada | 29/621.1 |
| 6,205,856 B1 | 3/2001 | Okada | 73/504.11 |
| 6,269,697 B1 | 8/2001 | Okada | 73/504.02 |
| 6,282,956 B1 | 9/2001 | Okada | 73/504.12 |
| 6,300,938 B1 * | 10/2001 | Culver | 345/156 |
| 6,313,826 B1 | 11/2001 | Schrum et al. | |
| 6,314,823 B1 | 11/2001 | Okada | 73/862.043 |
| 6,367,326 B1 | 4/2002 | Okada | 73/504.12 |
| 6,378,381 B1 | 4/2002 | Okada et al. | 73/862.043 |
| 6,474,133 B1 | 11/2002 | Okada | 73/1.38 |
| 6,477,903 B1 | 11/2002 | Okada | 73/862.043 |
| 6,512,364 B1 | 1/2003 | Okada | 324/158.1 |
| 6,530,283 B1 | 3/2003 | Okada et al. | 73/780 |
| 6,686,911 B1 * | 2/2004 | Levin et al. | 345/184 |
| 6,716,253 B1 | 4/2004 | Okada | |
| 6,772,632 B1 | 8/2004 | Okada | |
| 6,809,529 B1 | 10/2004 | Okada et al. | |
| 2001/0011994 A1 | 8/2001 | Morimoto et al. | |
| 2002/0060670 A1 * | 5/2002 | Jaeger et al. | 345/173 |
| 2002/0140633 A1 * | 10/2002 | Rafii et al. | 345/8 |

FOREIGN PATENT DOCUMENTS

| | | |
|---|---|---|
| WO | 99 17180 | 4/1999 |

* cited by examiner

INPUT DEVICE OF ROTATIONAL OPERATION QUANTITY AND OPERATING DEVICE USING THIS

BACKGROUND OF THE INVENTION

The present invention relates to a device for inputting a rotational operation quantity, and particularly to a mass-produced input device suitable for use in small electrical appliances and an operating device using this input device.

Small electrical appliances with a built-in microprocessor, such as cellular telephones, digital cameras, electronic game machines, or PDA devices, have spread remarkably, and, recently, demand has risen for various input devices to be built into these electrical appliances or into their peripheral devices. Generally, a device capable of indicating an operation quantity in an X-axis direction and an operation quantity in a Y-axis direction in an XY two-dimensional rectangular coordinate system or a device capable of performing click input in addition to the indication of the operation quantities is widely used as an input device for these electrical appliances. If the operation quantities in the X-axis and Y-axis directions can be indicated, it is possible to perform the operation of moving a cursor or a pointer on a display screen to an arbitrary position and perform the operation of selecting a predetermined item from a menu panel.

A device having a built-in two-dimensional force sensor is widely used as an input device for performing such an operation. The two-dimensional force sensor can divide the operation performed by an operator's thumb or finger into an operation quantity in the X-axis direction and an operation quantity in the Y-axis direction, and can recognize the operation quantities in the directions independently of each other. Preferably, a two-dimensional force sensor to be built into a small electrical appliance or its peripheral device is small and is suitable for mass production. In actual use, the two-dimensional force sensor employs various detecting elements, such as a capacitance element, piezoresistance element, and piezoelectric element.

If an input device for use in an electrical appliance has the function of inputting an operation quantity in the X-axis direction and an operation quantity in the Y-axis direction in the XY two-dimensional rectangular coordinate system and the function of performing the click input as mentioned above, it will become possible to execute almost all general application software programs on this electrical appliance. However, there are not a few application software programs that can be executed more flexibly if a rotational operation quantity can be input. For example, in software that reproduces sound or moving image, if the manner of being instructed by a rotational operation is employed when sound volume or forwarding/rewinding is adjusted, it will become possible to provide more intuitive instructions and obtain excellent operability.

An input device employing a rotary variable resistor or a variable capacitor has been conventionally used to input such a rotational operation quantity. However, such an input device has difficulty in being reduced in size and is not necessarily suitable to be built into a small electrical appliance, such as a cellular telephone, digital camera, electronic game machine, or PDA device. Additionally, these small electrical appliances each have a built-in input device employing the aforementioned two-dimensional force sensor in order to move a cursor or a pointer, and therefore it is inefficient to build still another input device thereinto in order to input a rotational operation quantity.

SUMMARY OF THE INVENTION

It is therefore an object of the present invention to provide a device for inputting an efficient rotational operation quantity which is suitable to be built into a small electrical appliance.

(1) The first feature of the invention resides in a rotational-operation-quantity input device for inputting an operation quantity indicating a predetermined rotation angle, comprising:

a two-dimensional force sensor for inputting an operational force applied by an operator in time series as a coordinate value (x, y) in an XY two-dimensional rectangular coordinate system;

a polar-coordinate converting section for sequentially converting the coordinate value (x, y) in the rectangular coordinate system given in time series into a coordinate value (r, θ) in a polar coordinate system; and an operation-quantity recognizing section for recognizing a variation in a value θ of the coordinate value (r, θ) obtained in time series as an operation quantity indicating a rotation angle.

(2) The second feature of the invention resides in the rotational-operation-quantity input device according to the first feature, wherein the operation-quantity recognizing section recognizes the coordinate value (r, θ) as a significant coordinate value when value r of the coordinate value (r, θ) is larger than a predetermined threshold rt, and recognizes an operation quantity based on a variation in a value θ in consideration of only a significant coordinate value (r, θ).

(3) The third feature of the invention resides in the rotational-operation-quantity input device according to the second feature, wherein the operation-quantity recognizing section recognizes an operation quantity based on a variation in value θ during a continuous period when a significant coordinate value (r, θ) is obtained continuously.

(4) The fourth feature of the invention resides in the rotational-operation-quantity input device according to the third feature, wherein, when a value θ generates a variation Δθ exceeding a predetermined threshold θt with respect to a value "θbefore" immediately therebefore during a continuous period during which a significant coordinate value (r, θ) is obtained continuously, the operation-quantity recognizing section recognizes a value corresponding to the variation Δθ as an operation quantity.

(5) The fifth feature of the invention resides in the rotational-operation-quantity input device according to the first to the fourth features, wherein the two-dimensional force sensor includes a sensor body, an operating panel that can be inclined in an X-axis direction and in a Y-axis direction independently of each other with respect to the sensor body, and detection means for detecting a coordinate value x and a coordinate value y based on a degree of an inclination in the X-axis direction and in the Y-axis direction of the operating panel.

(6) The sixth feature of the invention resides in an operating device including the rotational-operation-quantity input device according to the first to the fifth features, having an operational function to specify an icon, comprising:

icon display means for annularly displaying a plurality of icons on a display screen;

distinguishing means for displaying an indicator to distinguish a specified icon on the display screen by receiving an instruction to specify one of the plurality of icons;

initial-icon specifying means for specifying any one of the plurality of icons as a first specified icon; and specified-icon changing means for giving an instruction to change the specified icon into a new icon disposed at a position having an interval corresponding to an operation quantity recognized by the operation-quantity recognizing section of the input device.

(7) The seventh feature of the invention resides in an operating device including the rotational-operation-quantity input device according to the first to the fifth features, being used for volume control or for forwarding/rewinding control in reproducing sound, comprising:

rotation knob display means for displaying a rotation knob used to perform a volume control operation or a forwarding/rewinding control operation in reproducing sound on the display screen; and control means for determining a rotation quantity of the rotation knob correspondingly with an operation quantity recognized by the operation-quantity recognizing section of the input device and causing the rotation knob display means to perform a display corresponding to the rotation quantity while performing volume control or forwarding/rewinding control correspondingly with the rotation quantity.

(8) The eighth feature of the invention resides in an operating device including the rotational-operation-quantity input device according to the first to the fifth features, being used for frame feed in reproducing moving image, comprising:

rotation knob display means for displaying a rotation knob used to perform a frame feed operation in reproducing moving image on the display screen; and control means for determining a number of frames to be fed correspondingly with an operation quantity recognized by the operation-quantity recognizing section of the input device and causing the rotation knob display means to perform a display indicating a rotational operation corresponding to the number of frames.

DESCRIPTION OF THE PREFERRED EMBODIMENTS

Figure 1:
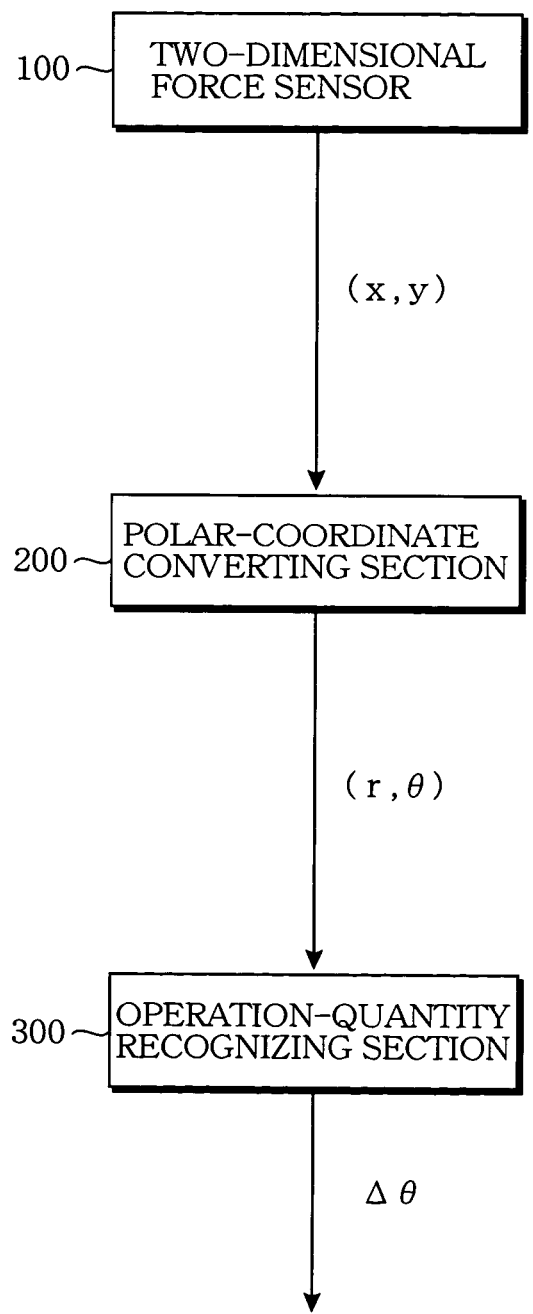
FIG. 1 is a block diagram showing the basic structure of an input device for inputting a rotational operation quantity according to the present invention (coordinate graphs shown at the right of the figure are conceptual diagrams of the function of each constituent element).

The present invention will hereinafter be described on the basis of the embodiments shown in the drawings.

<<<§1. Basic Structure of an Input Device for Inputting a Rotational Operation Quantity According to the Present Invention>>>

FIG. 1 is a block diagram showing the basic structure of an input device for inputting a rotational operation quantity according to the present invention (wherein coordinate graphs shown at the right of the figure are conceptual diagram of the function of each constituent element). The input device is a device for inputting an operation quantity indicating a predetermined rotation angle. As shown in the figure, the basic constituent elements thereof are a two-dimensional force sensor 100, a polar-coordinate converting section 200, and an operation-quantity recognizing section 300.

The two-dimensional force sensor 100 functions to input an operational force applied from an operator as a coordinate value (x, y) in the XY two-dimensional rectangular coordinate system in time series. A concrete structure of the two-dimensional force sensor 100 will be described in detail in § 3 mentioned below. In brief, any kind of two-dimensional force sensor 100 can be used as long as, when some operational force is applied in the X-axis and the Y-axis directions perpendicular to each other, the two-dimensional force sensor 100 has a function to detect operation quantities in the X-axis and the Y-axis directions based on the operational force. The coordinate graph at the right of the figure shows a state in which an arbitrary point P (x, y) in the XY two-dimensional rectangular coordinate system is input. In actuality, the operator performs the operation of applying some force in the X-axis and Y-axis directions, not the operation of specifying one point on a two-dimensional plane. The coordinate value (x, y), which is a detection value of the operation quantity, can be obtained as a string of data, such as coordinate values (x1, y1), (x2, y2), (x3, y3), . . . , in time series.

The polar-coordinate converting section 200 has a function of sequentially converting a coordinate value (x, y) thus given as a time series into a coordinate value (r, θ) in a polar coordinate system. For example, coordinate values (x1, y1), (x2, y2), (x3, y3), . . . , which have been obtained as a string of data in time series, are sequentially converted into coordinate values (r1, θ1), (r2, θ2), (r3, θ3), . . . . This converting processing is one that converts a coordinate value P (x, y) of an arbitrary point P in the XY two-dimensional rectangular coordinate system into a coordinate value P (r, θ) in the polar coordinate system, and can be performed by taking a coordinate value (x, y) as digital data and solving the equations r=square root $(x^2+y^2)$ and θ=arctan (y/x).

The operation-quantity recognizing section 300 functions to recognize a variation in the value θ of a coordinate value (r, θ) thus obtained in the order of time series as an operation quantity indicating a rotation angle. For example, as shown in the coordinate graph at the lower right of FIG. 1, if point Q(rq, θq) is given subsequently to point P(rp, θp), a variation Δθ=θq−θp of the value θ is recognized as an operation quantity indicating a rotation angle. According to the case of the figure, the rotational operation quantity Δθ denotes an operation quantity for giving instructions to be rotated by angle Δθ counterclockwise.

In FIG. 1, the constituent elements are shown as the functional blocks 100, 200, and 300, for convenience of explanation. However, in actuality, the two-dimensional force sensor 100 is formed by a predetermined physical structure and comprises a device having the function of outputting a detection value (x, y) as an electrical signal. The polar-coordinate converting section 200 and the operation-quantity recognizing section 300 take electrical signals output from the two-dimensional force sensor 100 as digital data and comprise a microprocessor or a microcomputer having the function of performing predetermined arithmetic processing.

Figure 2:
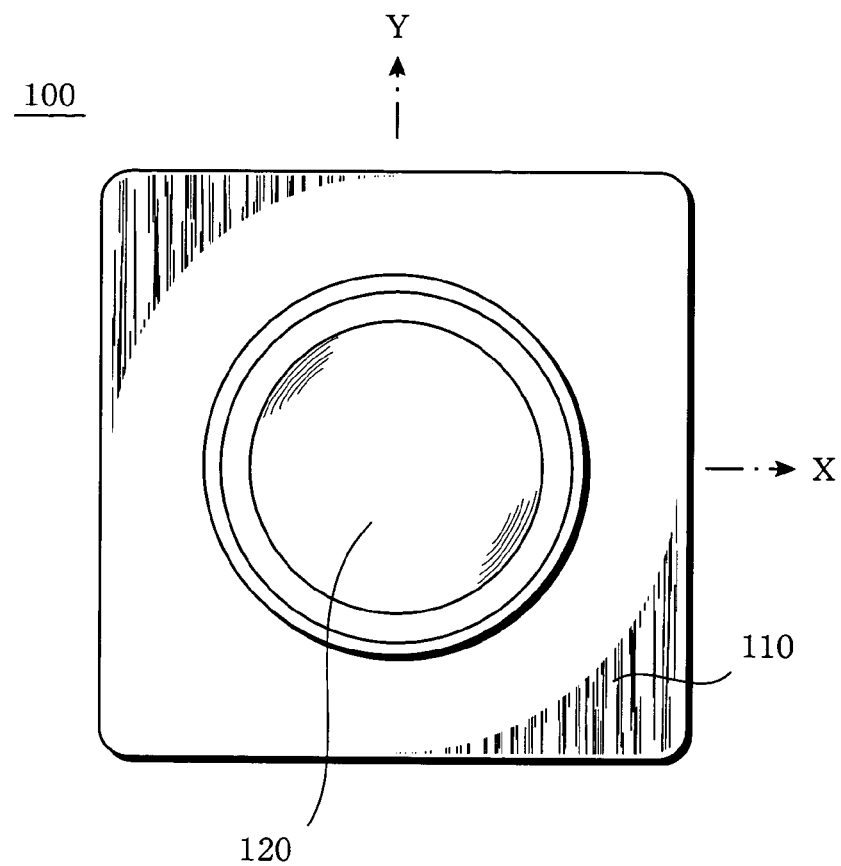
FIG. 2 is a top view showing a structural example of a two-dimensional force sensor 100 shown in FIG. 1.
Figure 3:
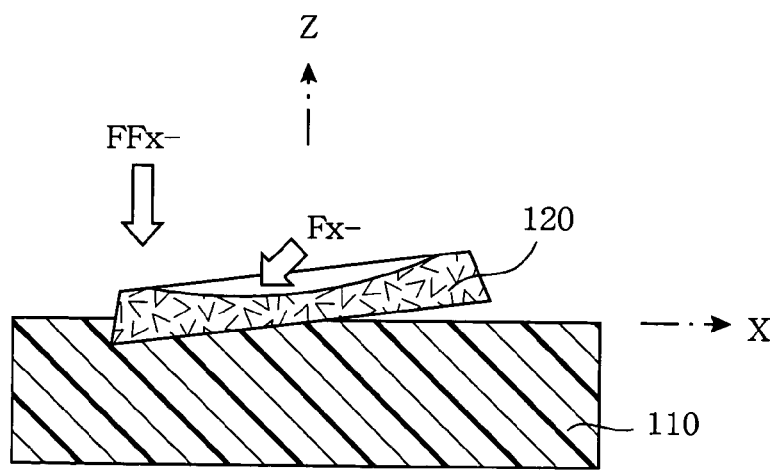
FIG. 3 is a side sectional view showing a structural example of the two-dimensional force sensor 100 shown in FIG. 1.

FIG. 2 is a top view showing a structural example of the two-dimensional force sensor 100, and FIG. 3 is a side sectional view of the two-dimensional force sensor 100. The two-dimensional force sensor 100 includes a sensor body 110 having an upper surface parallel to the XY plane, an operating panel 120 inclinable in the X-axis direction and in the Y-axis direction independently of each other with respect to the sensor body 110, and a detection means (not shown) for detecting coordinate values x and y based on inclination degrees in the X-axis and Y-axis directions of the operating panel 120. The side sectional view of FIG. 3 is a conceptual diagram showing the state of performing operational input to the two-dimensional force sensor 100. The sensor body 110 is shown as a single block. In actuality, the sensor body 110 has a built-in physical structure to support the operating panel 120 and a mechanism to detect the inclination of the panel 120, but, herein, the structure and the mechanism are omitted for reasons of convenience (a detailed structural example will be described in § 3)

As shown in the top view of FIG. 2, the operating panel 120 is a disk member and can be inclined in the X-axis direction (rightward and leftward directions) and in the Y-axis direction (upward and downward directions) in the figure independently of each other. The operator places his/her finger on the upper surface of the operating panel 120 while holding the sensor body 110 in other hand, and applies an operational force in a desired direction. Thereby, the operating panel 120 can be inclined in the X-axis and Y-axis directions independently of each other, and the inclination degrees in the X-axis and Y-axis directions can be adjusted by controlling the magnitude of the operational force. FIG. 3 shows a state in which the operating panel 120 is inclined in the X-axis negative direction with respect to the sensor body 110. In order to incline it in this state, the operator may perform the operation of applying a pressing force diagonally downward as shown by arrow Fx− in the figure while placing a finger on the center part of the upper surface of the operating panel 120, or may perform the operation of applying a pressing force vertically downward as shown by arrow FFx− while placing a finger on an end (left end in FIG. 3) of the upper surface of the operating panel 120. An operational force in the X-axis negative direction can be applied by either operation. An operational force in the X-axis positive direction can be similarly applied, and an operational force in the Y-axis positive or negative direction can be similarly applied, as a matter of course. Since the inclining operation in the X-axis direction of the operating panel 120 and the inclining operation in the Y-axis direction thereof are independent of each other, the operation applied to the operating panel 120 serves as the operation of giving an arbitrary coordinate value (x, y) in the XY two-dimensional rectangular coordinate system, as an end result.

As already described, the coordinate value (x, y) given in this way is converted into the coordinate value (r, $\theta$) in the polar-coordinate converting section 200, and the operation-quantity recognizing section 300 recognizes a rotational operation quantity $\Delta\theta$ based on the coordinate value (r, $\theta$) obtained in time series. For example, the operator applies a pressing force downward (in FIG. 2, vertically with respect to the sheet surface) while placing the finger on the edge of the operating panel 120 shown in FIG. 2, and slides the finger in such a way as to rotate it clockwise or counter-clockwise along the edge of the operating panel 120 while placing a finger thereon. Thereby, the operating panel 120 moves in a so-called precession movement of a spinning top, and the inclination direction makes a rotational movement. Therefore, the value $\theta$ of the coordinate value (r, $\theta$) given in time series continuously varies, and, based on its variation, a rotational operation quantity is recognized. If the variation of the value $\theta$ of the coordinate value (r, $\theta$) obtained in time series can be recognized as an operation quantity indicating a rotation angle, the recognition processing of the rotational operation quantity in the operation-quantity recognizing section 300 is not at all limited to a specific one. However, in practice, it is preferable to recognize the operation quantity based on the following principles.

Preferably, first, if the value r of a coordinate value (r, $\theta$) is larger than a predetermined threshold rt, the operation-quantity recognizing section 300 recognizes this coordinate value (r, $\theta$) as a significant coordinate value, and recognizes an operation quantity based on a variation in the value $\theta$ resulting from considering only the significant coordinate value (r, $\theta$). This is a consideration to recognize a rotational operation quantity only when it can be judged that the operator intentionally performs rotational-operation input. For example, let it be supposed that the operator is placing his/her finger on an upper surface part of the operating panel 120 of the two-dimensional force sensor 100 shown in FIG. 2. In this case, normally, a slight operational force is constantly applied onto the operating panel 120 by slight fluctuations of the fingertip even if the operator is not performing some intentional operational input. Therefore, a certain coordinate value (x, y) is detected in time series, and a certain coordinate value (r, $\theta$) is given in time series to the operation-quantity recognizing section 300.

Thus, it is undesirable to recognize an operation quantity regardless of the fact that the operator does not perform operational input intentionally. Therefore, if this coordinate value (r, $\theta$) is recognized as a significant coordinate value only when a value r of the coordinate value (r, $\theta$) given to the operation-quantity recognizing section 300 is larger than a predetermined threshold rt, it is possible to perform an operation while disregarding the coordinate value (r, $\theta$) having a value r smaller than the threshold rt. Normally, the inclination of the operating panel 120 does not become so large in the state of merely an operator placing a finger on the operating panel 120, and therefore the value r of the coordinate value (r, $\theta$) does not become so large. Therefore, the coordinate value (r, $\theta$) given in this state is disregarded without being recognized as a significant coordinate value, and the rotational operation quantity is never recognized.

In contrast, if the operator intentionally performs rotational-operation input, the operating panel 120 is inclined largely to some degree, and, as a result, the value r of the coordinate value (r, $\theta$) becomes larger than the predetermined threshold rt, and the coordinate value (r, $\theta$) is recognized as a significant value. Thus, if an operation quantity is recognized based on a variation in the value $\theta$ resulting from the consideration of only the significant coordinate value (r, $\theta$), the operation quantity can be recognized only when the operator intentionally performs operational input.

In actuality, when a significant coordinate value (r, $\theta$ is continuously obtained, an operation quantity should be recognized based on a variation in the value $\theta$ during this continuous period. For example, when a series of coordinate values (r1, $\theta$1), (r2, $\theta$2), (r3, $\theta$3), (r4, $\theta$4), (r5, $\theta$5), (r6, $\theta$6), (r7, $\theta$7), (r8, $\theta$8), and (r9, $\theta$9) are given and when r4 and r9 are smaller than the threshold rt, continuous periods during which a significant coordinate value can be obtained are a first period (r1, $\theta$1) to (r3, $\theta$3) and a second period (r5, $\theta$5) to (r8, $\theta$8). Therefore, first, an operation quantity based on the variation $\theta$1→$\theta$2 and an operation quantity based on the variation $\theta$2→$\theta$3 are recognized based on a variation in the value $\theta$ during the first period (r1, $\theta$1) to (r3, $\theta$3). Thereafter, an operation quantity based on the variation $\theta$5→$\theta$6, an operation quantity based on the variation $\theta$6→$\theta$7, and an operation quantity based on the variation $\theta$7→$\theta$8 are recognized based on a variation in the value $\theta$ during the second period (r5, $\theta$5) to (r8, $\theta$8).

If this recognition method is employed, a rotational operation quantity desired by the operator will be input even when the operator performs the operation of rotating its inclination direction while placing a finger on a point of the operating panel 120 (first period) and even when the operator temporarily separates the finger therefrom and then performs the same operation while placing the finger on another point thereof again (second period). In other words, a coordinate value (r4, $\theta$4) obtained when the finger is temporarily separated therefrom is disregarded because it is not a significant coordinate value, and an operation quantity based on the variation $\theta$3→$\theta$5 is never recognized because the coordinate values (r3, $\theta$3) and (r5, $\theta$5) obtained before and after the finger is temporarily separated are values in the different continuous periods. Therefore, even when the operator temporarily separates the finger from a first point of the operating panel 120 during a rotational operation and continues to carry out the rotational operation while placing the finger on a second point different from the first one, the moving operation of the finger from the first point to the second point will not be recognized as a rotational operation quantity. This handling coincides with the operational sensation of the operator and makes it possible to provide excellent operability.

On the other hand, if a variation in the value $\theta$ is small although the value r is larger than the threshold rt, there is the possibility that the operator will not be intentionally performing operational input. For example, let it be supposed that the operator applies some degree of pressing force while placing a finger on the left end of the upper surface of the operating panel 120 of the two-dimensional force sensor 100 shown in FIG. 2. In this situation, the operating panel 120 is in a state of being inclined as shown in FIG. 3, and the value r of the coordinate value (r, $\theta$) to be obtained becomes equal to a certain large value. However, actually, intentional rotational operation input is not applied if the operator is resting his/her finger in this state. But, in this situation, the values r and θ of the coordinate value (r, θ) slightly vary because slight variation factors are continually given to the operating panel 120 by slight movements of the fingertip as in the aforementioned situation. Likewise, it is undesirable to recognize an operation quantity in this situation.

Therefore, preferably, the threshold θt is predetermined, and the operation-quantity recognizing section 300 recognizes a value corresponding to a variation Δθ exceeding the predetermined threshold θt as an operation quantity when the value θ generates the variation Δθ with respect to the value "θbefore" immediately therebefore in a continuous period during which a significant coordinate value (r, θ) is continuously obtained. For example, if the threshold θt is predetermined as 5°, a variation Δθ is recognized as a rotational operation quantity only when the value θ generates the variation Δθ exceeding the degree 5° with respect to the significant coordinate value (r, θ) given immediately therebefore. Therefore, a rotational operation quantity is not recognized when the operator is resting his/her finger while placing the finger on the edge of the operating panel 120 as mentioned above.

Figure 4:
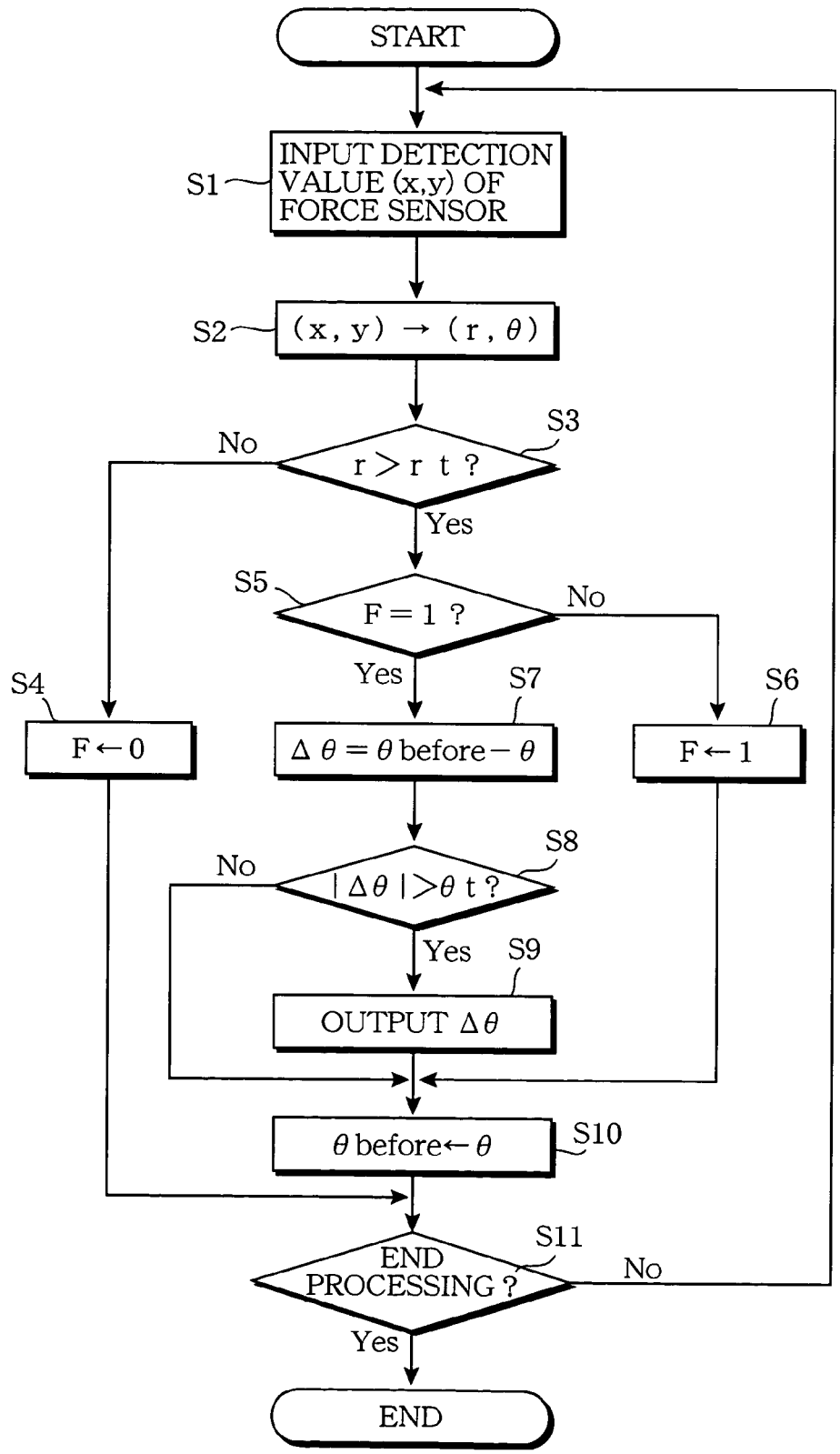
FIG. 4 is a flowchart showing an example of the processing operation of the rotational-operation-quantity input device shown in FIG. 1.

FIG. 4 is a flowchart showing one example of a concrete processing operation in which thresholds rt and θt are given to the values r and θ, respectively, and an operation quantity is thus recognized. First, in step S1, a detection value (x, y) of the two-dimensional force sensor 100 is input, and, in the subsequent step S2, the detection value (x, y) is converted into a coordinate value (r, θ) of a polar coordinate system. The processing performed in steps S1 and S2 is a process executed in the polar-coordinate converting section 200, and the processing performed in step S3 and in the subsequent steps is a process executed in the operation-quantity recognizing section 300.

In step S3, a determination is made as to whether the value r of an obtained coordinate value (r, θ) exceeds the threshold rt or not. If the value r is smaller than the threshold rt, the process proceeds to step S4, and flag F is set to be zero. This means that the obtained coordinate value (r, θ) is not a significant coordinate value. Flag F is to show the continuousness of a significant coordinate value (coordinate value the value r of which exceeds the threshold rt). If F=1, it is indicated that a significant coordinate value is continuously arriving, and, if F=0, it is indicated that such continuousness is broken. In step S3, if it is judged that r≦rt, the continuousness is interrupted, and flag F is set to be zero (F=0) in step S4. On the other hand, if it is judged that r>rt, a determination is made as to whether flag F is equal to 1 or not in step S5. This corresponds to a judgment as to whether a state has already been reached in which a significant coordinate value is continuously arriving or not. If F=0 in step S5, the continuousness of the significant coordinate value has been interrupted immediately therebefore. Therefore, in this situation, the process proceeds to step S6, in which flag F is set to be 1, and the state is recorded that the continuousness of a significant coordinate value has started.

On the other hand, if F=1 in step S5, at least the last coordinate value can be regarded as being a significant coordinate value. Therefore, processing for obtaining a variation Δθ of the value θ is performed regarding a significant coordinate value obtained at this time and the last coordinate value. That is, in step S7, an arithmetical operation is performed according to the equation $$\Delta\theta = \theta before - \theta,$$

where "θbefore" is the value θ of the last coordinate value (r, θ). Thereafter, in step S8, a determination is made as to whether or not the absolute value of Δθ exceeds the threshold θt. In step S9, Δθ is output as a rotational operation quantity only when the absolute value of Δθ exceeds the threshold θt. If the absolute value of Δθ is smaller than the threshold θt, it is judged that the operator is not inputting a rotational operation quantity intentionally, and the rotational operation quantity is not output in step S9.

In the subsequent step S10, the value θ of the present coordinate value (r, θ) is substituted for "θbefore." This procedure is repeatedly executed through step S11 until instructions to end the processing are given. In actuality, the repetition cycle of the procedure of steps S1 to S11 is set to be a predetermined cycle making it possible to input a rotational operation quantity smoothly. The cycle that has been set in this way corresponds to the cycle of the coordinate value (r, θ) given to the operation-quantity recognizing section 300 as time-series data, and constitutes a factor controlling the operability of an input device. Since an operational force onto the two-dimensional force sensor 100 is applied by a fingertip of the operator as mentioned above, it is meaningless to set an extremely smaller cycle than that of the movement velocity of the fingertip of the operator as the aforementioned cycle. For example, when a cycle of about 1 ms is set, this does not work as a useful cycle because, normally, an intentional movement of the finger of the operator does not have a vibration component of about 1000 Hz. In general, sufficient practicality can be obtained by setting a cycle of about 10 to 100 ms.

In effect, according to the procedure of FIG. 4, this coordinate value (r, θ) is recognized as a significant coordinate value (step S3) only when the value r of the coordinate value (r, θ) is larger than the predetermined threshold rt. Additionally, a value corresponding to the variation Δθ is recognized as a rotational operation quantity and is output (step S9) when such a significant coordinate value (r, θ) is continuously obtained (when it is judged that flag F is equal to 1 in step S5) and when the value θ generates a variation Δθ exceeding the predetermined threshold θt with respect to the value "θbefore" immediately therebefore (that is, when it is judged that the absolute value of Δθ exceeds θt in step S8).

<<<§2. Example in Using the Rotational-Operation-Quantity Input Device According to the Present Invention >>>

Next, a description will be given of a concrete use example of the input device for inputting a rotational operation quantity.

Figure 5:
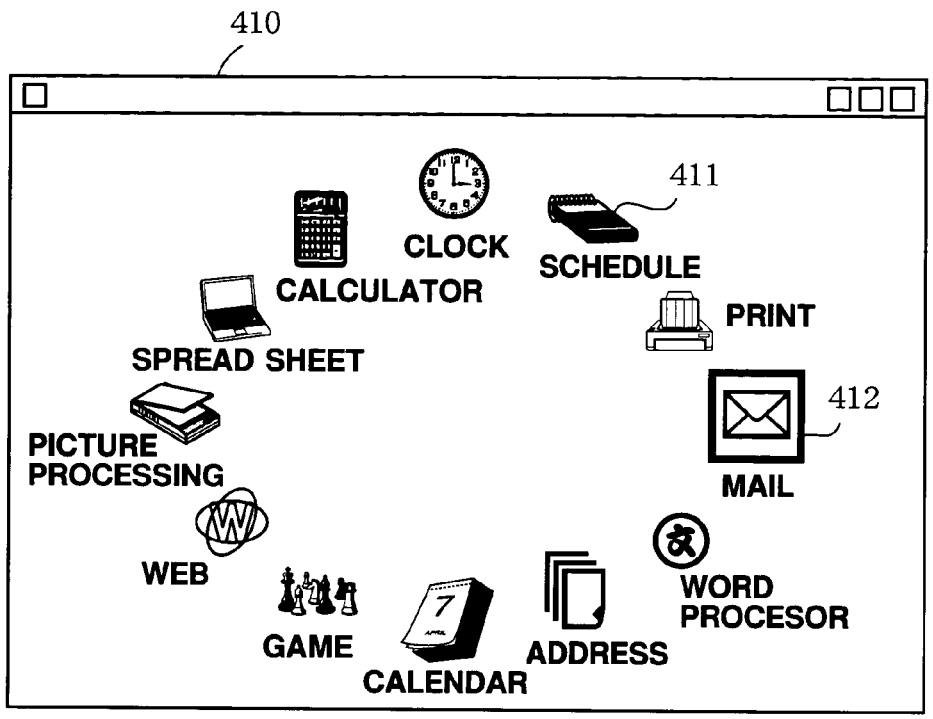
FIG. 5 is a screen view showing an example in which the rotational-operation-quantity input device according to the present invention is used for the operation of selection from a plurality of icons annularly disposed on a display screen.

FIG. 5 is a screen view showing an example using the rotational-operation-quantity input device according to the present invention in order to make a selection from a plurality of icons annularly arranged on a display screen. In this example, twelve icons 411 showing twelve kinds of application software programs are displayed on the display screen 410 of, for example, a personal computer. The icons 411 are arranged annularly, and are in a state in which one of the twelve icons 411 is specified by a cursor 412. In the example of the figure, an icon of "MAIL" application software placed at three o'clock is specified by the cursor 412. The cursor 412 thus functions as a distinguishing indicator to distinguish one of the plurality of icons as a specified icon.

The rotational-operation-quantity input device according to the present invention can be used to perform the changing input of a specified state of the annularly arranged icons. In an initialized state of the example of the figure, a specified icon is a "MAIL" icon. However, it becomes possible to change the specified icon clockwise or counterclockwise by inputting a predetermined rotational operation quantity by use of the rotational-operation-quantity input device of the present invention. For example, an adjustment can be made in the following way. When a rotational operation quantity of about $\Delta\theta=+15°$ to $+44°$ is given in the state of the figure, the cursor 412 is moved counterclockwise by 30° so as to be moved to a "PRINT" icon next thereto by one icon. When a rotational operation quantity of about $\Delta\theta=+45°$ to $+74°$ is given, the cursor 412 is moved counterclockwise by 60° so as to be moved to a "SCHEDULE" icon next thereto by two icons. When a rotational operation quantity of about $\Delta\theta=+75°$ to $+104°$ is given, the cursor 412 is moved counterclockwise by 90° so as to be moved to a "CLOCK" icon next thereto by three icons. It is also possible to give a rotational operation quantity of a negative angle, of course. For example, when a rotational operation quantity of about $\Delta\theta=-15°$ to $-44°$ is given, the cursor 412 can be moved clockwise by 30° so as to be moved to a "WORD PROCESSOR" icon next thereto by one icon.

In effect, the operating device shown in FIG. 5 includes an icon display means for annularly arranging and displaying a plurality of icons on the display screen 410, a distinguishing means for displaying an indicator (cursor 412) to distinguish a specified icon from the icons as an icon pointed out on the display screen 410 by receiving an instruction to specify any one of the plurality of icons, an initial-icon specifying means for specifying any one of the plurality of icons as a first specified icon, a rotational-operation-quantity input device mentioned in §1, and a specified-icon changing means for giving an instruction to change the specified icon into a new icon disposed at a position with an interval corresponding to an operation quantity recognized by the operation-quantity recognizing section 300 included in the input device.

Figure 6:
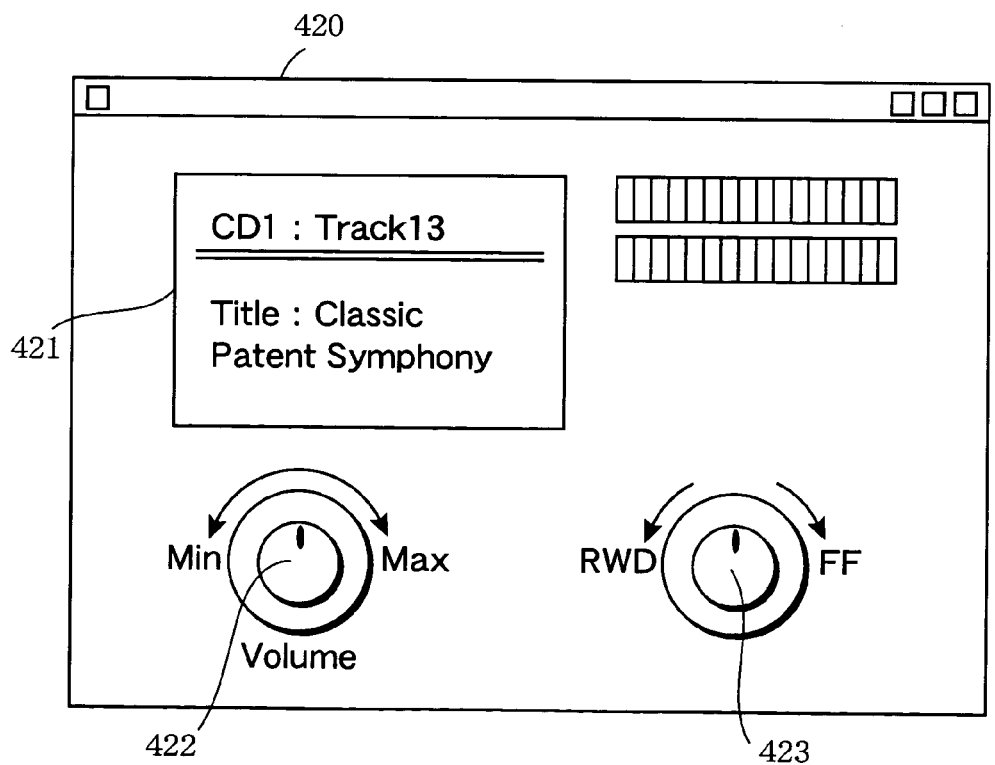
FIG. 6 is a screen view showing an example in which the rotational-operation-quantity input device according to the present invention is used to adjust a rotation knob to perform a volume control operation in reproducing sound or a fast-forwarding/rewinding operation while displaying the rotation knob on a display screen.

FIG. 6 is a screen view showing an example using the rotational-operation-quantity input device of the present invention in order to display a rotation knob for performing a volume control operation or a forwarding/rewinding operation in reproducing sound on the display screen and operate the rotation knob. In this example, a display window 421 used for a display concerning sound to be reproduced is provided on the display screen 420 of, for example, a personal computer. There are further displayed a rotation knob 422 used to perform a volume control operation in reproducing the sound and a rotation knob 423 used to perform a forwarding/rewinding operation. Further, the rotation knobs 422 and 423 are virtual knobs conveniently displayed on the display screen 420. An actual rotational operation is performed of the operating panel 120 of the two-dimensional force sensor 100 shown in FIG. 2. For example, when a rotational operation quantity of $\Delta\theta=20°$ is given to the two-dimensional force sensor 100 after some operation relating to the operational input of the rotation knob 422 is performed, processing is performed on the supposition that operational input to rotate the rotation knob 422 by 20° has been provided.

In brief, the operating device shown in FIG. 6 is made up of a rotation knob display means for displaying the rotation knobs 422 and 423 used to perform a volume control operation or a forwarding/rewinding control operation in reproducing sound on the display screen 420, the rotational-operation-quantity input device mentioned in §1, and a control means for determining the rotation quantity of the rotation knobs 422 and 423 in accordance with an operation quantity recognized by the operation-quantity recognizing section 300 included in the input device, making a volume-control adjustment or a forwarding/rewinding adjustment in accordance with the rotation quantity, and controlling and causing the rotation knob display means to make a display corresponding to the rotation quantity.

Figure 7:
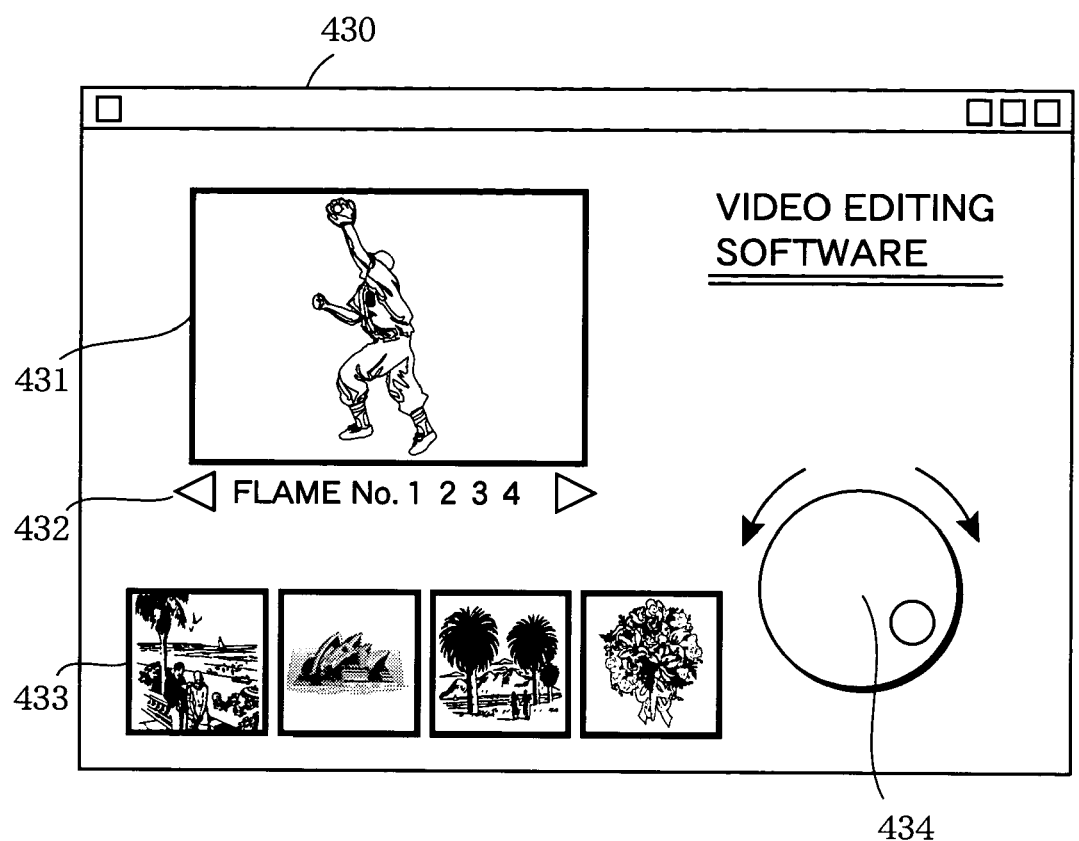
FIG. 7 is a screen view showing an example in which the rotational-operation-quantity input device according to the present invention is used to adjust a rotation knob to perform a frame feed operation in reproducing moving image while displaying the rotation knob on a display screen.

FIG. 7 is a screen view showing an example using the rotational-operation-quantity input device of the present invention in order to display a rotation knob for performing a frame feed operation in reproducing moving image on the display screen and operating the rotation knob. In this example, a moving image display window 431 used to display a moving image to be reproduced is provided on the display screen 430 of, for example, a personal computer, and a frame-number display block 432 used to display the frame number of a moving image being displayed is provided under the window 431. A moving-image selecting block 433 used to select a moving image to be reproduced is provided under the block 432, and a rotation knob 434 used to perform a frame feed operation is provided at the right thereof. Likewise, in this example, the rotation knob 434 is a virtual knob conveniently displayed on the display screen 430. An actual rotational operation is performed of the operating panel 120 of the two-dimensional force sensor 100 shown in FIG. 2. For example, when a rotational operation quantity of $\Delta\theta=20°$ is given to the two-dimensional force sensor 100 after some input operation to specify the rotation knob 434 is performed, processing is performed on the supposition that operational input to rotate the rotation knob 434 by 20° has been provided. For example, if a rotational angle of 10° of the rotation knob 434 is set to correspond to a one-frame feed of a moving image (forward feed and reverse feed of a direction of movement of a moving image) herein, a two-frame feed operation is performed by a rotation of 20°, and an image corresponding to this frame will be displayed in the moving-image display window 431.

In brief, the operating device shown in this FIG. 7 is made up of a rotation knob display means for displaying the rotation knob 434 to perform a frame feed operation in reproducing moving image on the display screen 430, the rotational-operation-quantity input device mentioned in §1, and a control means for determining the number of frames to be fed in accordance with an operation quantity recognized by the operation-quantity recognizing section 300 included in the input device and controlling and causing the rotation knob display means to make a display indicating a rotational operation corresponding to the number of the frames.

Although the use examples of the rotational-operation-quantity input device of the present invention have been described as above, the usage manner of the input device of the present invention is not limited to these examples.

<<<§3. Concrete Structure of Two-Dimensional Force Sensor>>>

Lastly, a description will be given of a concrete structural example of the two-dimensional force sensor used in the rotational-operation-quantity input device of the present invention. This structural example is a force detector using a capacitance element disclosed in Japanese Patent Laid Open Publication No. 2003-131786. This has a relatively simple structure suitable for mass production, and is characterized by being capable of performing an operation controlling power consumption. This structural example, of course, shows one aspect of the two-dimensional force sensor usable in the present invention, and the two-dimensional force sensor shown herein does not necessarily need to be used in embodying the present invention.

Figure 8:
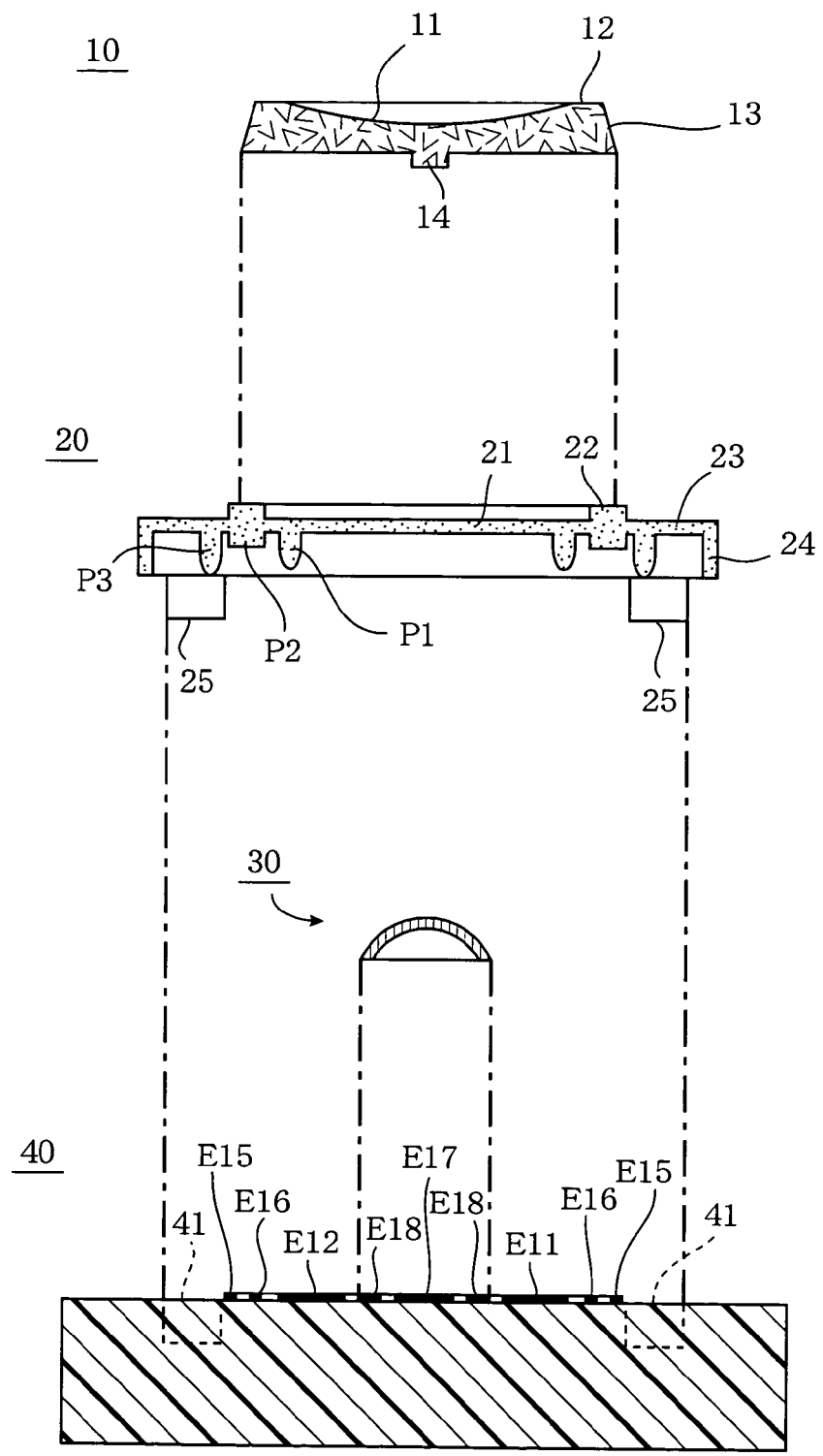
FIG. 8 is an exploded side sectional view showing a concrete structural example of the two-dimensional force sensor 100 shown in FIG. 1.

A description will be first given of the basic structure of the two-dimensional force sensor. FIG. 8 is an exploded side sectional view showing constituent elements obtained by disassembling the two-dimensional force sensor. As shown in the figure, the two-dimensional force sensor is made up of an operating panel 10, an elastic deformable body 20, a dome-shaped structure 30, and a substrate 40. In actuality, the input device is formed by disposing the dome-shaped structure 30 on the substrate 40, covering it with the elastic deformable body 20, and further attaching the operating panel 10 thereonto. The two-dimensional force sensor is provided with not only a function of operational input indicating the operation quantities in the X-axis and Y-axis directions but also an additional function of switch input indicating an ON/OFF state.

The operating panel 10 is disposed on the upper surface of the elastic deformable body 20, and functions to transmit a force applied by the operation of the operator to the elastic deformable body 20, thereby elastically deforming the elastic deformable body 20. As described in §1, the operating panel 10 is inclined with respect to the substrate 40 based on the operational force of the operator, and functions to elastically deform the elastic deformable body 20, thereby displacing a part of the elastic deformable body 20 with respect to the substrate 40.

Figure 9:
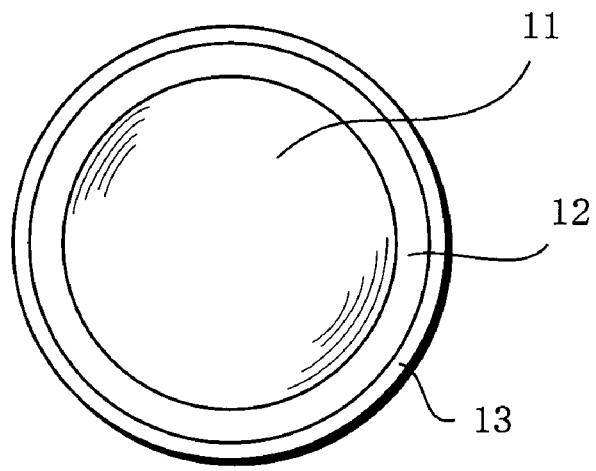
FIG. 9 is a top view of an operating panel 10 shown in FIG. 8. A side cross section obtained by cutting the operating panel 10 at the center is shown in FIG. 8.
Figure 10:
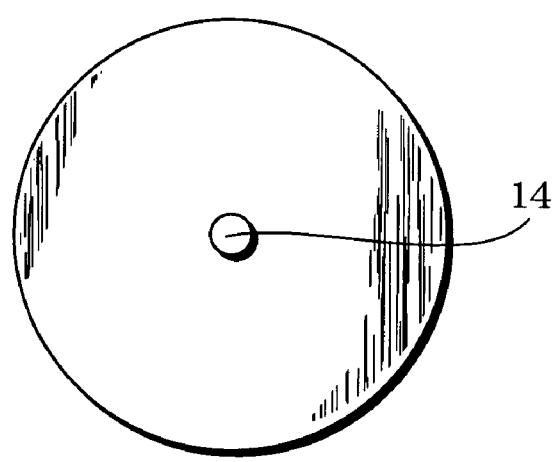
FIG. 10 is a bottom view of the operating panel 10 shown in FIG. 8. A side cross section obtained by cutting the operating panel 10 at the center is shown in FIG. 8.

FIG. 9 is a top view of the operating panel 10, and FIG. 10 is a bottom view of the operating panel 10. As shown in the figures, the operating panel 10 is shaped like a disk as a whole, and is made of resin, such as plastics, in this embodiment. If the operating panel 10 can function to transmit a force to the elastic deformable body 20 as mentioned above, the operating panel 10 can assume any shape, but a disk-like shape is suitable to input a rotational operation quantity. Additionally, it is preferable to construct it with rigid materials, such as resin or metal, in order to infallibly transmit the operation of the operator to the elastic deformable body 20. In the embodiment shown in the figures, the operating panel 10 is made up of three parts, i.e., an operating part 11, a bank part 12, and an outer periphery part 13 as shown in FIG. 9, and a cylindrical pressing rod 14 protrudes from the undersurface thereof as shown in FIG. 10. The operating part 11 has a smooth hollow formed inside the bank part 12 so as to fit the fingers of the operator, and the outer periphery part 13 has a taper formed outside the bank part 12. The pressing rod 14 is used to effectively perform a switch input that indicates an ON/OFF state as described later, and can function to effectively transmit a vertically downward force applied by the operator to the vicinity of the vertex of the dome-shaped structure 30.

Figure 11:
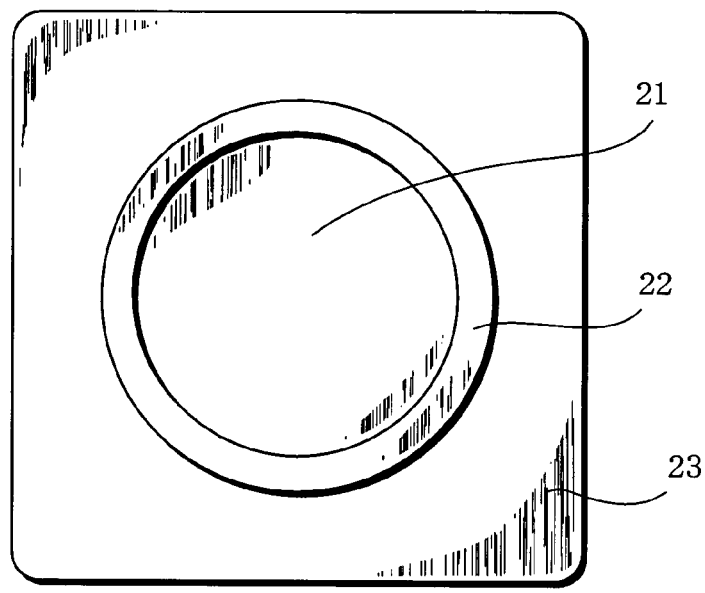
FIG. 11 is a top view of an elastic deformable body 20 shown in FIG. 8. A side cross section obtained by cutting the elastic deformable body 20 at the center is shown in FIG. 8.
Figure 12:
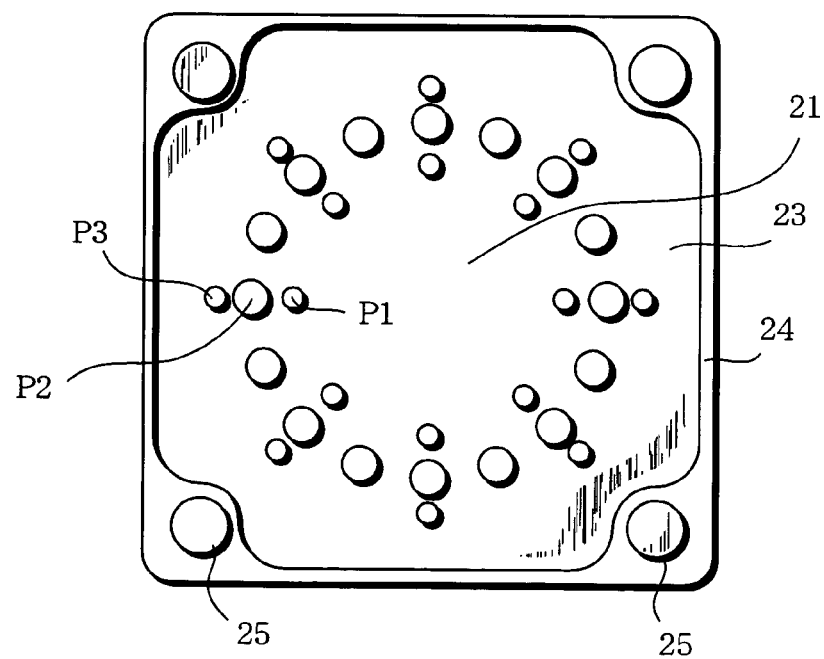
FIG. 12 is a bottom view of the elastic deformable body 20 shown in FIG. 8. A side cross section obtained by cutting the elastic deformable body 20 at the center is shown in FIG. 8.

The elastic deformable body 20 is made of integrally-molded silicon rubber in this embodiment. FIG. 11 is a top view of the elastic deformable body 20, and FIG. 12 is a bottom view of the elastic deformable body 20. The elastic deformable body 20 is almost square in a plane as shown in the figures. As shown in the side sectional view of FIG. 8, the basic constituent elements thereof are an inner film part 21, an annular uplift part 22, an outer film part 23, a sidewall part 24, a fixed leg part 25, and pillar-shaped projections P1 to P3. As shown in FIG. 11, the inner film part 21 and the outer film part 23 are each a film-like structure that forms the whole of the square upper surface of the elastic deformable body 20, and, in this embodiment, the inner portion of the annular uplift part 22 will be called the inner film part 21, and the outer portion thereof will be called the outer film part 23, for convenience of explanation. The film parts 21 and 23 are disposed to be almost parallel to the upper surface of the substrate 40 with the dome-shaped structure 30 therebetween. The annular uplift part 22 is an annular uplift part formed on the upper surface of the film part, and the periphery of the upper surface part of the inner film part 21 is enclosed by the annular uplift part 22. In this embodiment, the annular uplift part 22 has a so-called washer-like structure whose section is rectangular. This is the result of consideration to efficiently receive a force from the operating panel 10 disposed on the upper surface thereof.

On the other hand, the sidewall part 24 functions to fix the periphery of the outer film part 23 to the upper surface of the substrate 40. The four sides of the square film parts 21 and 23 are supported by the sidewall part 24, and the film parts 21 and 23 are kept almost parallel to the upper surface of the substrate 40. As shown in the bottom view of FIG. 12, cylindrical fixed leg parts 25 at the four corners of the undersurface of the elastic deformable body 20 are extended downward. The four fixed leg parts 25 are inserted into fixed holes 41 (see FIG. 8) formed at four points of the upper surface of the substrate 40. The elastic deformable body 20 is thus fixed to a predetermined position on the substrate 40.

Figure 13:
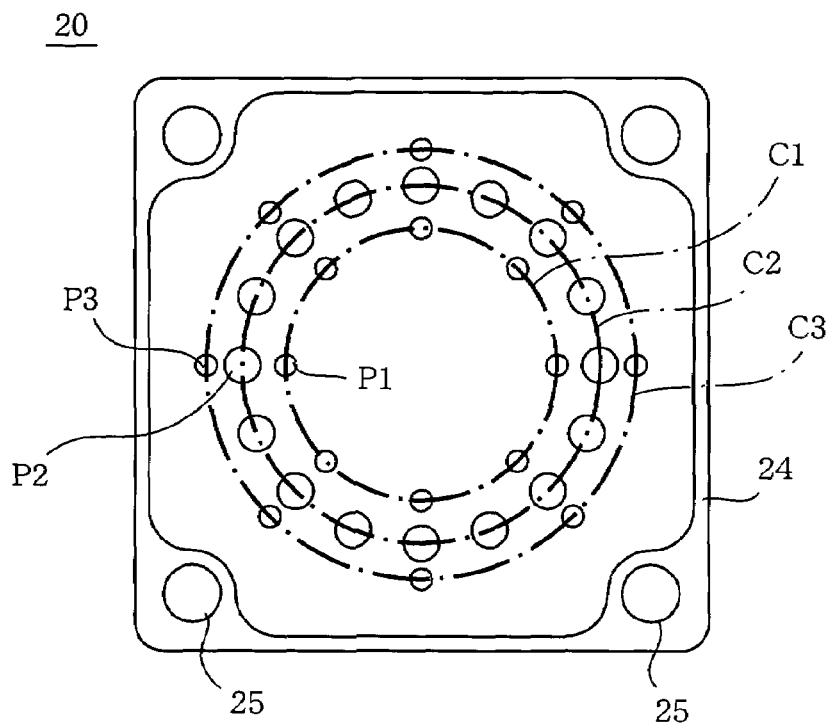
FIG. 13 is a bottom view for explaining an arrangement of pillar-shaped projections formed on the undersurface of the elastic deformable body 20 shown in FIG. 12.

As shown in FIG. 12, a plurality of pillar-shaped projections P1 to P3 extending downward are formed on the undersurface of the film parts 21 and 23. FIG. 13 is a view produced by adding the concentric circles of the alternate long and short dashed line to the bottom view of FIG. 12, in order to clarify the positions of the pillar-shaped projections P1 to P3. If three kinds of concentric circles C1, C2, and C3 are defined around the center point of the elastic deformable body 20 as shown in the figure, it can be understood that the pillar-shaped projections P1 to P3 are situated on the circumference of any one of the concentric circles. In greater detail, eight pillar-shaped projections P1 in total are disposed on the circumference of the inner concentric circle Cl at intervals of circumferential angle 45°, sixteen pillar-shaped projections P2 in total are disposed on the circumference of the basic concentric circle C2 at intervals of circumferential angle 22.5°, and eight pillar-shaped projections P3 in total are disposed on the circumference of the outer concentric circle C3 at intervals of circumferential angle 45°.

The side shape of each pillar-shaped projection P1 to P3 is clearly shown in the side sectional view of FIG. 8. In the side sectional view of FIG. 8, only the pillar-shaped projections situated on the cut plane among all of the projections are shown in order to avoid drawing complexity. However, in actuality, more pillar-shaped projections are extended downward from the undersurface of the film part as shown in the bottom views of FIG. 12 and FIG. 13. Herein, the pillar-shaped projection P2 is set to be shorter in length than the pillar-shaped projections P1 and P3 as shown in FIG. 8. The reason is that the pillar-shaped projections P1 and P3 are different from the pillar-shaped projection P2 in the main function. That is, the pillar-shaped projections P1 and P3 mainly function to support the inner and outer film parts 21 and 23 with respect to the upper surface of the substrate 40, when the operator does not make any input operation to the operating panel 10. The pillar-shaped projections P1 and P3 are set to have a suitable length for fulfilling the supporting function (although the pillar-shaped projection P1 is slightly shorter than the pillar-shaped projection P3 in the example of the figure, this results from consideration of the thickness of an electrode formed on the substrate 40 as described later) Focusing attention on this function, the pillar-shaped projections P1 and P3 will be each called a "supporting pillar-shaped projection."

In contrast, the pillar-shaped projection P2 mainly functions to assist a function serving as an intermediary electrode by which a change into an electric conductive state is caused by coming into contact with electrodes formed on the upper surface of the substrate 40 as described later. Therefore, the pillar-shaped projection P2 will be called "contacting pillar-shaped projection." The contacting pillar-shaped projection P2 is set to be shorter than the supporting pillar-shaped projections P1 and P3, in order to maintain the state of keeping the lower end of the contacting pillar-shaped projection P2 suspended and maintaining the state of not having physical contact with the electrodes formed on the upper surface of the substrate 40 when the input from the operator is not given to the operating panel 10.

The supporting pillar-shaped projections P1 and P3 are different from the contacting pillar-shaped projection P2 not only in length but also in the side shape. That is, each of the supporting pillar-shaped projections P1 and P3 has a slightly round lower end, whereas the contacting pillar-shaped projection P2 has a disk-like planar lower end. This geometrical difference is based on the aforementioned functional difference. The lower end of each of the supporting pillar-shaped projections P1 and P3 is shaped to be suitable to support the substrate 40 while being in contact with the upper surface thereof, whereas the lower end of the contacting pillar-shaped projection P2 is shaped to be suitable to maintain an electrically conductive state while being in contact with the electrodes formed on the upper surface of the substrate 40.

Since a force applied by the operator can be regarded as being transmitted along a concentric circle centering on the center axis of the operating panel 10 when the operating panel 10 is constructed with a disk-like rigid member like the embodiment shown herein, it is preferable to dispose the pillar-shaped projections P1 to P3 along predetermined circumferences, respectively, as shown in FIG. 12 and FIG. 13. Especially in the embodiment shown in the figures, when operational input that indicates a predetermined direction is applied to the operating panel 10, the applied force is transmitted from the periphery part of the operating panel 10 to the annular uplift part 22. Therefore, herein, the basic concentric circle C2 shown in FIG. 13 is assumed as a circle exactly corresponding to the center position of the annular uplift part 22 so as to dispose the contacting pillar-shaped projection P2 at a predetermined position (16 points) just under the annular uplift part 22. Further, the inner concentric circle C1 is defined inside the basic concentric circle C2 so as to dispose the supporting pillar-shaped projection P1 on its circumference, and the outer concentric circle C3 is defined outside the basic concentric circle C2 so as to dispose the supporting pillar-shaped projection P3 on its circumference.

Since the operating panel 10 is inclined in an arbitrary direction when it is used as the rotational-operation-quantity input device of the present invention, it is preferable to dispose at least eight pillar-shaped projections on a circumference at intervals of circumferential angle 45° as in the embodiment. In the embodiment shown in the figure, the supporting pillar-shaped projections P1 and P3 disposed on the inner and outer concentric circles C1 and C3, respectively, at intervals of circumferential angle 45° are each eight in total number. However, concerning the contacting pillar-shaped projection P2 disposed on the basic concentric circle C2, the number thereof is increased to reliably come into contact with the electrodes on the substrate 40, and sixteen projections P2 in total are disposed at intervals of circumferential angle 22.5°.

Figure 14:
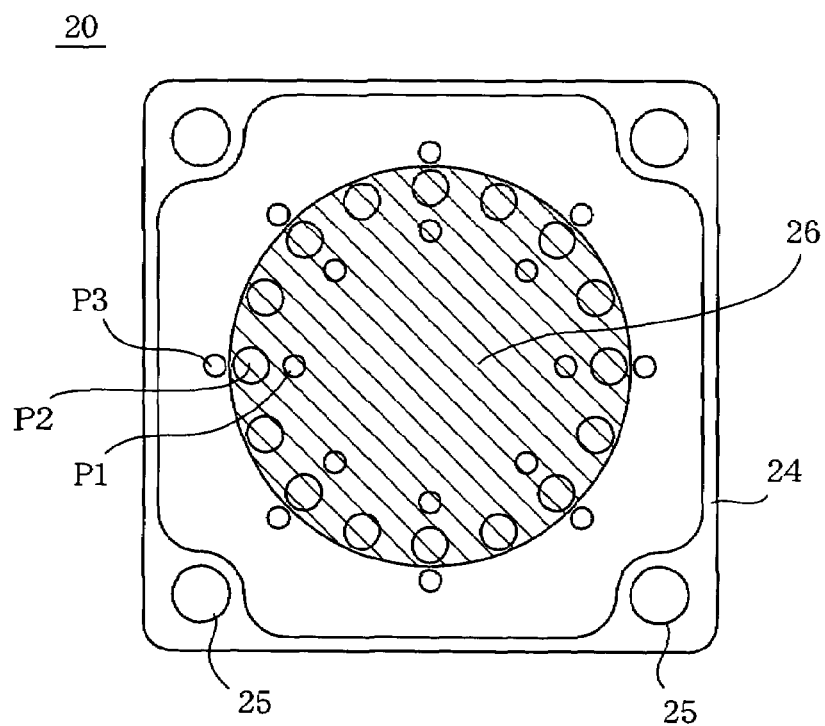
FIG. 14 is a bottom view showing a displacement conductive layer 26 formed on the undersurface of the elastic deformable body 20 shown in FIG. 12. It is to be noted that hatching in FIG. 14 is to show a region, not show a cross section.

Another important constituent element, which is a constituent element of the elastic deformable body 20, is a displacement conductive layer 26 formed in a predetermined region of the undersurface of the film part. FIG. 14 is a bottom view of the elastic deformable body 20 to show a formative region of the displacement conductive layer 26. The displacement conductive layer 26 is formed in the hatched region of the circle in the figure (hatching in FIG. 14 is to show a region, not show a cross section). A plurality of pillar-shaped projections are formed on the undersurface of the elastic deformable body 20 as mentioned above, and the displacement conductive layer 26 is formed on the undersurface of the elastic deformable body 20 including the surfaces of these pillar-shaped projections. Therefore, the displacement conductive layer 26 is formed also on the surface part of the supporting pillar-shaped projection P1 and that of the contacting pillar-shaped projection P2 situated in the hatched region in FIG. 14. In detail, the displacement conductive layer 26 can be formed with a conductive-material-made layer applied onto the undersurface of the elastic deformable body 20. Since the elastic deformable body 20 is formed with integrally-molded silicon rubber in this embodiment as mentioned above, a structure as shown in the figure including pillar-shaped projections is integrally molded with silicon rubber, and thereafter conductive paint is applied onto one region of the undersurface (hatched region in the circle of FIG. 14) and is dried, whereby the displacement conductive layer 26 can be formed. The displacement conductive layer 26 is not shown in the side sectional view because the thickness of the displacement conductive layer 26 is smaller than that of each part of the elastic deformable body 20.

Figure 15:
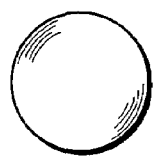
FIG. 15 is a top view of a dome-shaped structure 30 shown in FIG. 8. A side cross section obtained by cutting the dome-shaped structure 30 at the center is shown in FIG. 8.
Figure 16A:
FIGS. 16A and 16B are side sectional views for explaining a shape reversal motion of the dome-shaped structure 30 shown in FIG. 8.
Figure 16B:
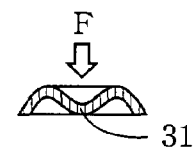

On the other hand, the dome-shaped structure 30 is an inverted-cup-shaped structure as shown in the side sectional view of FIG. 8, and is invertedly disposed in the vicinity of the center of the upper surface of the substrate 40. FIG. 15 is a top view of the dome-shaped structure 30. Although the shape of the dome-shaped structure 30 is not limited to a specific one, it is preferable to use the dome-shaped structure 30 whose planar shape is a circle as shown in the figure, because the operational input in each direction can be smoothly performed. Additionally, the dome-shaped structure 30 has a property of causing a shape reversal in which the vicinity of its vertex is elastically deformed and becomes convex downward when a downward pressing force greater than a predetermined force is applied to the vicinity of the vertex. FIGS. 16A and 16B are side sectional views showing a state of such a shape reversal. FIG. 16A shows a state in which no external force is applied, and FIG. 16B shows a state in which a downward pressing force F is applied to the vicinity of the vertex, and a shape reversal is caused so that the vicinity of the vertex is elastically deformed and becomes convex downward. Since this shape reversal, of course, is elastically deformed, the dome-shaped structure 30 returns to the original state of FIG. 16A when the pressing force F does not exist.

The shape reversal of the dome-shaped structure 30 is used for switch input (which does not have a direct relationship to the input of a rotational operation quantity according to the present invention) by the operator. Therefore, at least a part of the undersurface of the dome-shaped structure 30 is required to serve as a conductive contact surface 31. That is, the switch input is detected by bringing the conductive contact surface 31 into contact with an electrode provided on the substrate 40 when the vicinity of the vertex causes a shape reversal as shown in FIG. 16B. In this embodiment, a metallic dome is used as the dome-shaped structure 30. Generally, it is possible to cause a shape reversal, such as the aforementioned one, and realize a dome having the conductive contact surface 31 by forming a dome-shaped structure with metallic materials, but the dome-shaped structure 30 does not necessarily need to be made of metallic materials. For example, it is permissible to realize the conductive contact surface 31 by constructing a dome-shaped structure with resin or the like and forming a conductive material film on its undersurface.

Figure 17:
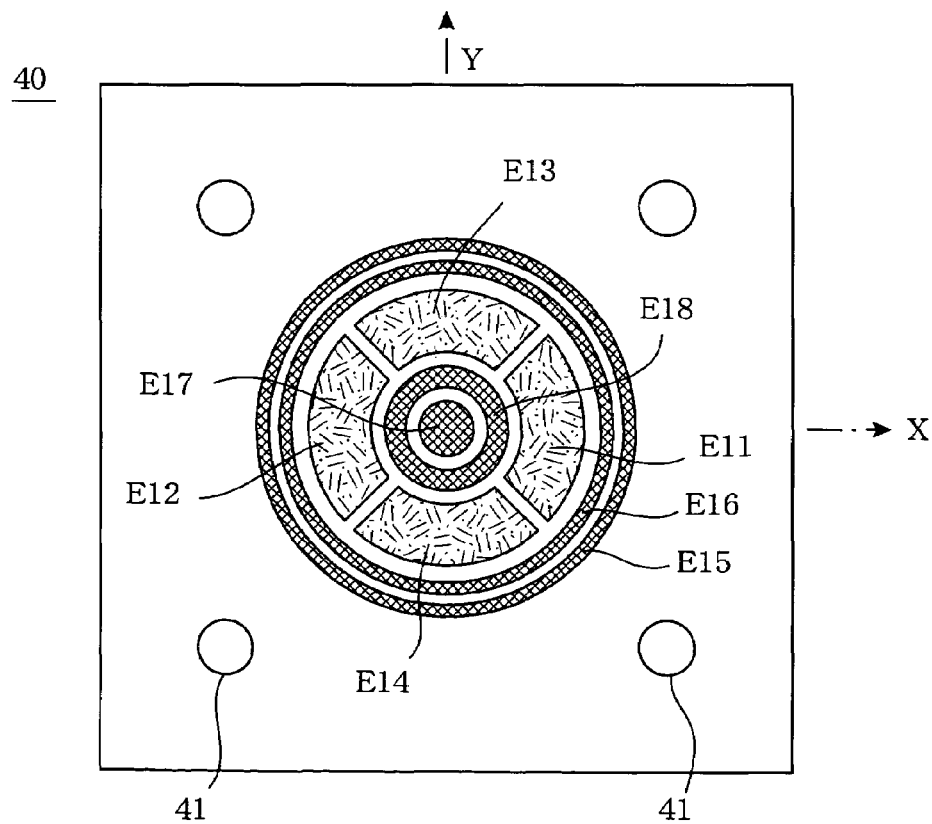
FIG. 17 is a top view of a substrate 40 shown in FIG. 8. A side cross section obtained by cutting the substrate 40 at the center (XZ plane) is shown in FIG. 8. It is to be noted that hatching in FIG. 17 is to show regions, not show a cross section.

Next, the structure of the substrate 40 will be described. The substrate 40 basically has a function to place the aforementioned constituent elements thereon and support them and a function to provide a reference plane used to form each electrode. FIG. 17 is a top view of the substrate 40. Four fixed holes 41 shown in the figure are holes made in the upper surface of the substrate 40 in order to insert the fixed leg part 25 of the elastic deformable body 20 thereinto as mentioned above.

Electrodes E11 to E18 are provided on the upper surface of the substrate 40 as shown in the figure. Herein, based on the arrangement position of each electrode, four fan-shaped electrodes E11 to E14 will be each called an intermediate electrode, two annular electrodes E15 and E16 disposed outside them will be each called an outer electrode, and a circular electrode E17 and an annular electrode E18 disposed inside will be each called an inner electrode. In FIG. 17, each electrode is hatched to clearly show the shape of each electrode. Therefore, hatching in FIG. 17 does not show a cross section. In the figure, two kinds of hatching patterns are used to indicate that the surfaces of some of the electrodes are covered with an insulating film. In greater detail, the four intermediate electrodes E11 to E14 each function as a detecting fixed electrode for forming a capacitance element and therefore its surface is covered with an insulating film, whereas the outer electrodes E15 and E16, and the inner electrodes E17 and E18 each function as a contacting electrode used to judge whether an electrical contact exists or not and therefore its conductive surface remains exposed. The two kinds of hatching patterns make a distinction between the electrode covered with the insulating film and the electrode whose conductive surface remains exposed.

The outermost annular outer electrode E15 is formed at an outer-periphery facing part that faces an outer periphery part of the operating panel 10 (i.e., an upper surface part of the substrate 40 onto which an outer border line of the operating panel 10 is projected). Since the operating panel 10 is shaped like a disk in this embodiment, an outer-periphery facing part that faces its peripheral circle assumes the shape of a circle, and the outer electrode E15 is an annular (washer-like) electrode disposed at the position facing the peripheral circle of the operating panel 10 as shown in the figure. The outer electrode E16 is an annular (washer-like) electrode disposed slightly inside the outer electrode El5. Concerning their more exact positions, the boundary between the outer electrode E15 and the outer electrode E16 is situated on the circumference facing the basic concentric circle C2 shown in FIG. 13, and the distance between the outer outline of the outer electrode E15 and the inner outline of the outer electrode E16 is designed to become almost equal to the diameter of the contacting pillar-shaped projection P2. Therefore, the two outer electrodes E15 and E16 are disposed exactly under each contacting pillar-shaped projection P2.

When operational input in a predetermined direction is applied from the operator to the operating panel 10, and the elastic deformable body 20 is deformed, the outer electrodes E15 and E16 function to come into contact with the displacement conductive layer 26 formed on the undersurface of the contacting pillar-shaped projection P2 and detect that the applied operational input is greater than a predetermined force. In greater detail, when the elastic deformable body 20 is deformed by the operational input of the operator, and the displacement conductive layer 26 formed on the undersurface of any one of the contacting pillar-shaped projections P2 is simultaneously brought into contact with both of the outer electrodes El5 and E16, the outer electrodes E15 and E16 reach an electrically conductive state through the displacement conductive layer 26 being in contact. Therefore, it is possible to judge whether operational input greater than a predetermined force has been applied or not by electrically detecting a conductive state between the outer electrodes E15 and E16. If the outer electrodes E15 and E16 are called a pair of contacting electrodes, and the displacement conductive layer 26 formed on the undersurface of each contacting pillar-shaped projection P2 is called an intermediary electrode while focusing attention on this function, a switch element will be made up of a pair of contacting electrodes formed on the substrate 40 and an intermediary electrode formed on the elastic deformable body 20. The pair of contacting electrodes that constitute this switch element normally maintain an electrically insulating state (i.e., before operational input greater than a predetermined force is applied to the operating panel 10). However, when operational input greater than the predetermined force is applied to the operating panel 10, the intermediary electrode simultaneously comes into contact because of the deformation of the elastic deformable body 20, and, as a result, an electrically conductive state is reached.

The four fan-shaped intermediate electrodes E11 to E14 are disposed at positions suitable to detect operational input in a predetermined direction applied by the operator. That is, if an origin O is taken at the center on the upper surface of the substrate 40 shown in FIG. 17, an X-axis is taken rightward in the figure, a Y-axis is taken upward in the figure, and an XYZ three-dimensional coordinate system is defined to include the upper surface of the substrate within the XY-plane, the intermediate electrode E11 is formed in an X-axis positive region, the intermediate electrode E12 is formed in an X-axis negative region, the intermediate electrode E13 is formed in a Y-axis positive region, and the intermediate electrode E14 is formed in a Y-axis negative region. The role of each of the intermediate electrodes E11 to E14 exists in forming a capacitance element with the displacement conductive layer 26 situated thereabove. That is, the displacement conductive layer 26 is formed on the undersurface of the film part of the elastic deformable body 20 as shown by the hatched lines of FIG. 14, and four pairs of capacitance elements in total are formed by the intermediate electrodes E11 to E14 and by each part of the displacement conductive layer 26 facing them. In greater detail, a first capacitance element C11 is formed by the intermediate electrode E11 disposed in the X-axis positive region and by a part of the displacement conductive layer 26 facing this, a second capacitance element C12 is formed by the intermediate electrode E12 disposed in the X-axis negative region and by a part of the displacement conductive layer 26 facing this, a third capacitance element C13 is formed by the intermediate electrode E13 disposed in the Y-axis positive region and by a part of the displacement conductive layer 26 facing this, and a fourth capacitance element C14 is formed by the intermediate electrode E14 disposed in the Y-axis negative region and by a part of the displacement conductive layer 26 facing this.

The four pairs of capacitance elements C11 to C14 formed in this way are each made up of the detecting fixed electrode (i.e., intermediate electrodes E11 to E14) fixed to the substrate 40 and the detecting displacement electrode (i.e., displacement conductive layer 26) formed at the "position facing the detecting fixed electrode and at which a displacement arises" of the elastic deformable body 20. As mentioned above, the upper surface of each of the four intermediate electrodes E11 to E14 functioning as a detecting fixed electrode is covered with an insulating film, and an electrical contact between the electrodes E11 to E14 and the displacement conductive layer 26, which functions as a detecting displacement electrode, is blocked. As described later, the displacement conductive layer 26 may be brought close to the substrate 40 because of the deformation of the elastic deformable body 20 when operational input is applied, but, since the insulating film is formed, the displacement conductive layer 26 and the intermediate electrodes E11 to E14 never come in electrical contact with each other. Therefore, the capacitance elements C11 to C14 will always function as a capacitance element. The insulating film may be formed not on the detecting fixed electrode but on the detecting displacement electrode (i.e., on the undersurface of the displacement conductive layer 26), or it may be formed on both sides. However, in this embodiment, the displacement conductive layer 26 is formed as an electrically conductive paint applied to the undersurface of the elastic deformable body 20. Therefore, in actuality, it is preferable to form the insulating film on the side of the detecting fixed electrode, i.e., on the intermediate electrodes E11 to E14.

Figure 18:
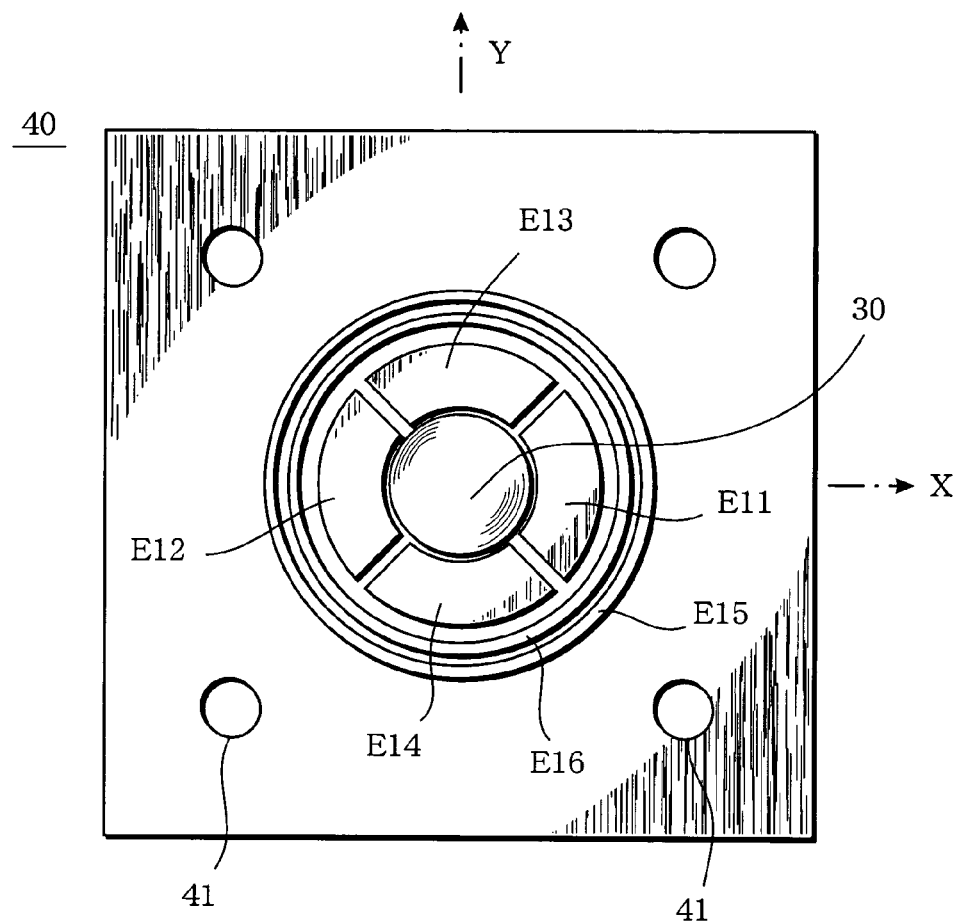
FIG. 18 is a top view showing a state in which the dome-shaped structure 30 is disposed on the substrate 40 shown in FIG. 17.

As shown in FIG. 17, the two inner electrodes E17 and E18 are formed further inside the intermediate electrodes E11 to E14, i.e., in the vicinity of the center of the substrate 40. The role of the pair of inner electrodes E17 and E18 exists in detecting the switch input to the operating panel 10 applied by the operator, i.e., detecting a vertically downward pressing force. The inner electrode E17 is a disk-like electrode disposed at the center of the substrate, and its diameter is set to be smaller than that of a circle that constitutes the bottom circumferential surface (i.e., edge part of the bottom) of the dome-shaped structure 30. On the other hand, the inner electrode E18 is a washer-like electrode, and its outer diameter is set to be almost equal to the diameter of a circle that constitutes the bottom circumferential surface of the dome-shaped structure 30. The dome-shaped structure 30 is placed on the washer-like inner electrode E18. FIG. 18 is a top view showing a state in which the dome-shaped structure 30 of FIG. 15 is disposed at the center of the upper surface of the substrate 40 of FIG. 17. In actuality, the dome-shaped structure 30 is fixed to the upper surface of the substrate 40 by the use of an adhesive agent or a bonding tape.

When a vertically downward pressing force F is applied to the vicinity of the vertex of the dome-shaped structure 30 as shown in FIG. 16B, the dome-shaped structure 30 is subjected to a shape reversal. At this time, the inner electrode E17 has a shape suitable to come into contact with the conductive contact surface 31 of the undersurface of the dome-shaped structure 30. In this embodiment, the entire dome-shaped structure 30 is made of metal. Therefore, in the state of FIG. 16A, the dome-shaped structure 30 is in contact only with the washer-like inner electrode E18. However, in the state of FIG. 16B, the vicinity of the vertex, which has been reversed, is brought into contact also with the inner electrode E17, and a function is carried out to bring the pair of inner electrodes E17 and E18 into a mutually conductive state. That is, the inner electrodes E17 and E18 are formed by the pair of electrodes physically separated from each other, and, when the metallic dome-shaped structure 30 is reversed, the bottom circumferential surface of the dome-shaped structure 30 comes into contact with the inner electrode E18. Thereby, the undersurface in the vicinity of the vertex reaches the state of being in contact with the inner electrode E17, and the dome-shaped structure 30 made of electrically conductive material comes into contact with the two inner electrodes E17 and E18 simultaneously, whereby they reach an electrically conductive state. In effect, it is possible to detect an ON/OFF state concerning the switch input of the operator by electrically detecting a conductive state between the pair of inner electrodes E17 and E18. It is to be noted that the dome-shaped structure 30 does not necessarily need to make the whole thereof constituted with electrically conductive material, and, if a part ranging from at least the inner surface (i.e., the undersurface being inverted) to the bottom circumferential surface is used as a conductive contact surface, the inner electrodes E17 and E18 can be brought into an electrically conductive state.

As mentioned above, the three types of electrodes, i.e., the pair of outer electrodes E15 and E16 (contacting electrodes), the four intermediate electrodes E11 to E14 (detecting fixed electrodes), and the pair of inner electrodes E17 and E18 (contacting electrodes), are formed on the upper surface of the substrate 40. Considering each function, the electrodes are disposed at the following positions. First, the inner electrode E18 is disposed at the position of contact with the bottom circumferential surface of the dome-shaped structure 30 as mentioned above, and the inner electrode E17 is disposed at the position capable of coming into contact with the conductive contact surface 31 that corresponds to the undersurface in the vicinity of the vertex when the dome-shaped structure 30 causes a shape reversal. The pair of outer electrodes E15 and E16 are disposed at an outer-periphery facing part (i.e., part that faces the basic concentric circle C2 of FIG. 13) on the substrate 40 that faces the outer periphery part of the operating panel 10. On the other hand, the intermediate electrodes E11 to E14 are disposed at a predetermined part in "an intermediate region outside the arrangement region of the dome-shaped structure 30 and inside the aforementioned outer-periphery facing part" of the upper surface of the substrate 40. In this embodiment, the substrate 40 is made of a printed board for mounting an electronic circuit, and each electrode is made of a print pattern, such as copper formed on the printed board. If the substrate 40 is made of a circuit printed board in this way, various wirings can be given on the substrate 40 through the print pattern, and practical convenience can be achieved.

The displacement conductive layer 26 hatched in FIG. 14 is a single conductive layer formed on the undersurface of the elastic deformable body 20, and carries out an important function in cooperation with each electrode placed on the substrate 40. That is, a part of the displacement conductive layer 26 formed on the undersurface of the contacting pillar-shaped projection P2 comes into contact simultaneously with the pair of outer electrodes E15 and E16 on the substrate 40 as an intermediary electrode, thereby, fulfilling a function to bring the pair of outer electrodes E15 and E16 (i.e., contacting electrodes) into an electrically conductive state. A part of the displacement conductive layer 26 facing the intermediate electrodes E11 to E14 carries out a function to constitute a capacitance element with the intermediate electrodes E11 to E14 (detecting fixed electrodes) as a detecting displacement electrode. These have different functions as described above, but, in consideration of operational convenience described later, it is preferable to keep the intermediary electrode and the detecting displacement electrode in a conductive state. Therefore, in actuality, it is preferable to form the displacement conductive layer 26 with a physically single conductive layer which extends the position of the contacting pillar-shaped projection P2 as shown by the hatched lines of FIG. 14, so that a part of the displacement conductive layer 26 (i.e., part formed on the undersurface of the contacting pillar-shaped projection P2) functions as an intermediary electrode, and another part (i.e., part facing the intermediate electrodes E11 to E14) functions as a detecting displacement electrode.

A description has been given of the structural details of the constituent elements shown in FIG. 8 as above. An actual two-dimensional force sensor is constructed by accumulating these constituent elements. In detail, the dome-shaped structure 30 is placed on the central part of the substrate 40, the elastic deformable body 20 is then placed in such a way as to cover this (the fixed leg part 25 is inserted and fixed into the fixed hole 41), and the operating panel 10 is bonded thereonto. As a result, a two-dimensional force sensor as shown in the side sectional view of FIG. 19 (which shows not a cross section but a side of the dome-shaped structure 30) can be obtained.

Figure 19:
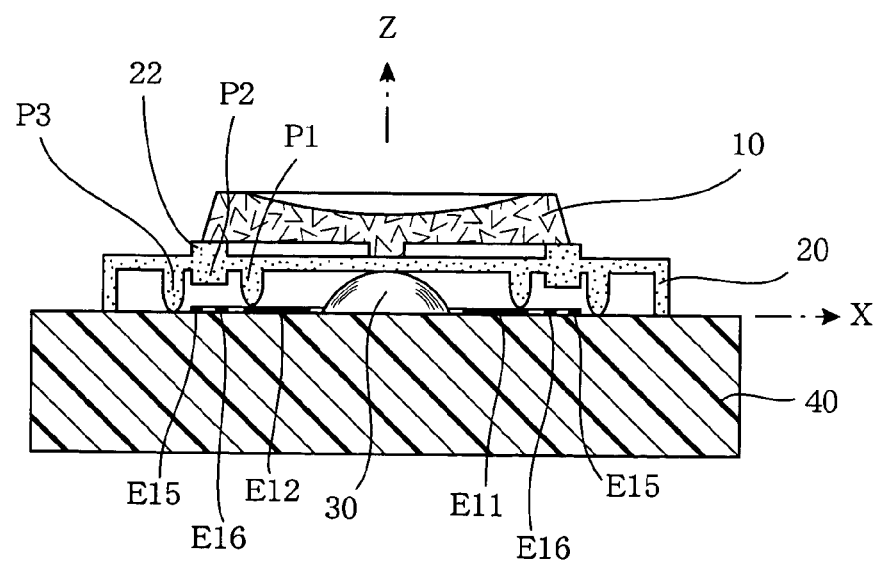
FIG. 19 is a side sectional view of a two-dimensional force sensor formed by assembling the constituent elements shown in FIG. 8. It is to be noted that the part of the dome-shaped structure 30 shown herein is not a section but a side. Additionally, only the cross section of each of the pillar-shaped projections P1 to P3 is shown, the far inner part of each pillar-shaped projection being omitted.

Next, a description will be given of the basic operation of the two-dimensional force sensor shown in FIG. 19. Herein, for convenience sake, a description will be given as follows on the supposition that an origin O is taken at the center of the upper surface of the substrate 40, an X-axis is taken rightward in the figure, a Y-axis is taken upward in the figure, and an XYZ three-dimensional coordinate system is defined so that the upper surface of the substrate is included in an XY plane. In FIG. 19, the X-axis is defined rightward in the figure, the Z-axis is defined upward in the figure, and the Y-axis is defined vertically with respect to the sheet surface of the figure.

As already described, the two-dimensional force sensor has a function to perform switch input (so-called click input) that indicates an ON/OFF state, in addition to a function to perform operational input that indicates an operation quantity in the X-axis and Y-axis directions. The operator performs the inputting acts with respect to the operating panel 10. Basically, when the switch input is performed, the operator presses the operating panel 10 downward (in the Z-axis negative direction) while placing his/her finger on the central part of the operating panel 10, and, when the operational input (i.e., input of a rotational operation quantity) in the X-axis and Y-axis directions is performed, the operator presses the operating panel 10 diagonally downward.

Figure 20:
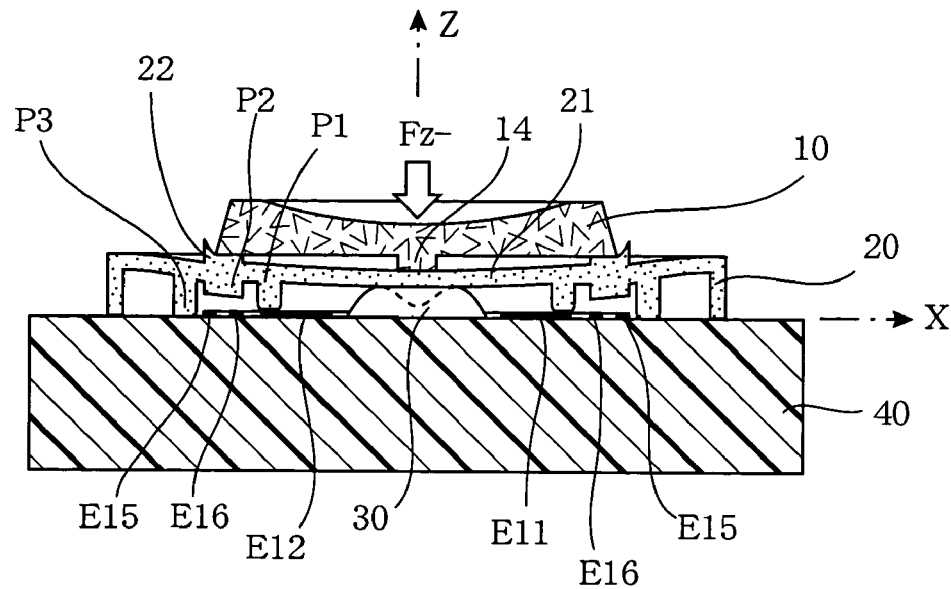
FIG. 20 is a side sectional view showing a state in which switch input (click input) is performed in the two-dimensional force sensor shown in FIG. 19. It is to be noted that the part of the dome-shaped structure 30 shown herein is not a section but a side. Additionally, only the cross section of each of the pillar-shaped projections P1 to P3 is shown, the far inner part of each pillar-shaped projection being omitted.

FIG. 20 is a side sectional view (a side view concerning the dome-shaped structure 30) showing the deformation of each part that appears when the operator performs switch input. When a downward pressing force (hereinafter referred to as Fz– in the sense of a force in the Z-axis negative direction) is applied to the operating panel 10 in the figure, the pressing rod 14 is displaced downward by the pressing force Fz–, and a downward force is applied to the vertex part of the dome-shaped structure 30 through the inner film part 21. Since the dome-shaped structure 30 has the property of bringing about a shape reversal in which a part around the vertex of the dome-shaped structure 30 is elastically deformed and becomes convex downward when a downward pressing force greater than a predetermined force is applied to the vicinity of the vertex thereof. Therefore, when the magnitude of the pressing force Fz– exceeds a predetermined critical value, the vicinity of the vertex of the dome-shaped structure 30 causes a shape reversal as shown in the figure. That is, when the operator gradually strengthens the downward pressing force Fz–, the dome-shaped structure 30 suddenly collapses and reaches the state of the figure, so that a click sensation is transmitted to the fingertip of the operator. At the same time, the supporting pillar-shaped projections P1 and P3 made of elastic materials are elastically deformed and slightly collapse in the longitudinal direction. However, the contacting pillar-shaped projection P2 remains suspended.

When the dome-shaped structure 30 causes a shape reversal in this way, the conductive contact surface 31 of the undersurface of the dome-shaped structure 30 is brought into contact with the inner electrode E17 of FIG. 17, and, as a result, the inner electrode E17 and the inner electrode E18 reach an electrically conductive state. When the operator stops pressing it, the dome-shaped structure 30 returns to the former state, and the device returns to the state of FIG. 19. In this situation, the inner electrodes E17 and E18 are in an insulation state. In effect, the switch input that indicates an ON/OFF state can be detected by detecting an electric connection between the inner electrode E17 and the inner electrode E18, and the so-called click input can be detected.

Next, consideration will be given to a case in which the operator performs operational input that indicates an operation quantity in the X-axis direction or in the Y-axis direction. In this embodiment, four sets of capacitance elements in total are formed by the four intermediate electrodes E11 to E14 (whose upper surface is covered with an insulating layer) shown in FIG. 17 and a displacement conductive layer 26 facing them. Based on the electrostatic capacitance value of these four sets of capacitance elements, an operation quantity in each direction can be detected.

Figure 21:
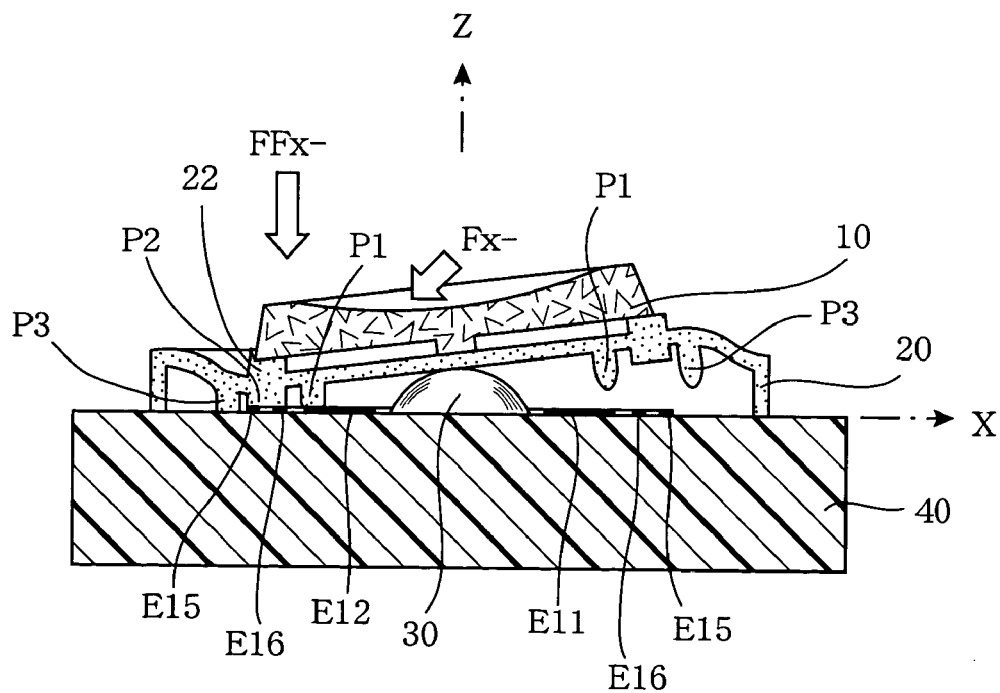
FIG. 21 is a side sectional view showing a first state in which operational input in an X-axis negative direction is performed in the two-dimensional force sensor shown in FIG. 19. It is to be noted that the part of the dome-shaped structure 30 shown herein is not a section but a side. Additionally, only the cross section of each of the pillar-shaped projections P1 to P3 is shown, the far inner part of each pillar-shaped projection being omitted.

For example, let it be supposed that the operator performs the operation of applying a diagonally downward force including a force in the X-axis negative direction onto the operating panel 10. Herein, the force applied by this operation will be referred to as Fx–. FIG. 21 is a side sectional view (a side view concerning the dome-shaped structure 30) showing the deformation of each part when the operator applies this operational force Fx– (the force does not necessarily need to be applied to the center of the operating panel 10, and, in actuality, is often applied to its part slightly deviated leftward from the center as shown in the figure). Since the operational force Fx– is a diagonally downward force component, it also contains a downward force component (Z-axis negative direction component) in the figure. However, since this downward force component is smaller than the pressing force Fz– generated by the click operation, a force large enough to cause a shape reversal is not applied to the dome-shaped structure 30. Therefore, the operating panel 10 is inclined so that the left side thereof falls, and the right side thereof rises in FIG. 21. In other words, as the dome-shaped structure 30, use should be made of a structure having the deformation property of being subjected to a shape reversal by a vertically downward pressing force of switch input and not being subjected to a shape reversal by a diagonally downward force of operational input in a predetermined direction. The same phenomenon occurs when a vertically downward operational force FFx– is applied to a part in the vicinity of the left end of the operating panel 10 in the figure instead of the diagonally downward operational force Fx– shown in FIG. 21. In the present invention, the term "operational input that indicates an operation quantity in the X-axis negative direction" contains not only a diagonally downward operational input like the operational force Fx– but also an operational input like the operational force FFx– by which a position displaced in the X-axis negative direction is pressed vertically downward. The operational force FFx– and the operational force Fx– are equivalent in the operational input.

Figure 22:
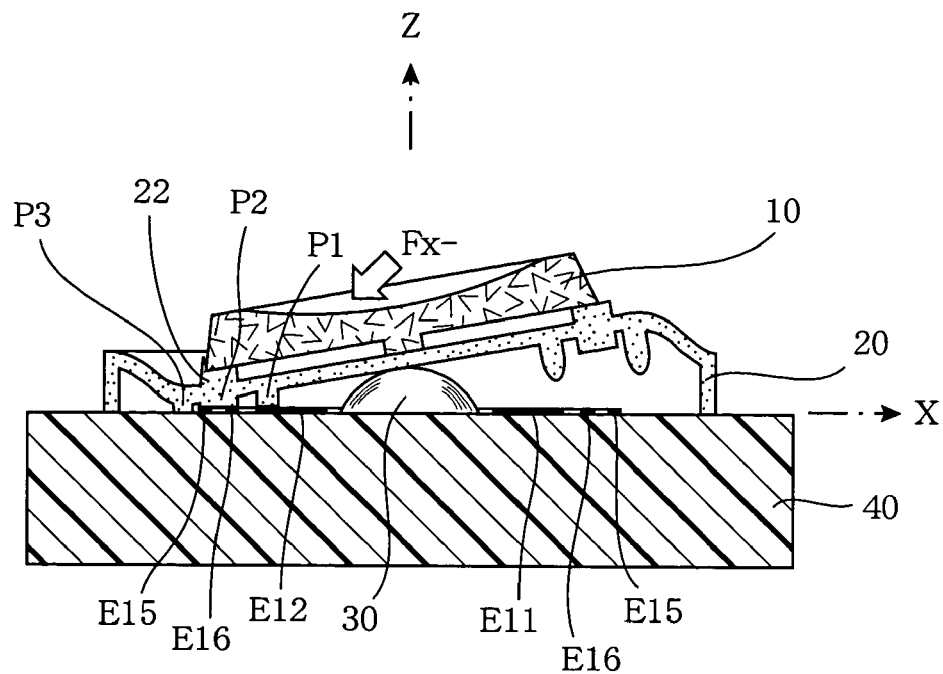
FIG. 22 is a side sectional view showing a second state in which operational input in the X-axis negative direction is performed in the two-dimensional force sensor shown in FIG. 19. It is to be noted that the part of the dome-shaped structure 30 shown herein is not a section but a side. Additionally, only the cross section of each of the pillar-shaped projections P1 to P3 is shown, and the far inner part of each pillar-shaped projection is omitted.
Figure 23:
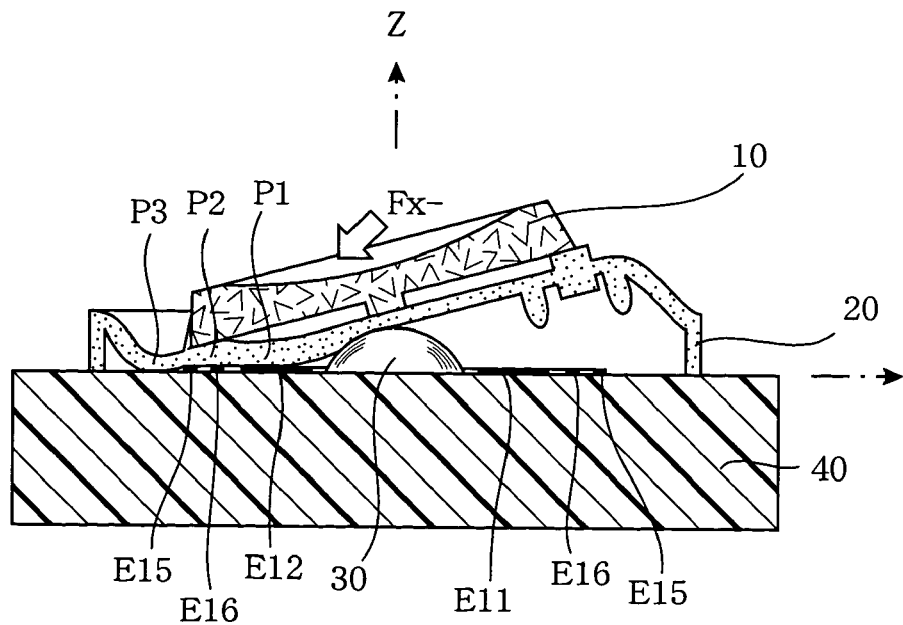
FIG. 23 is a side sectional view showing a third state in which operational input in the X-axis negative direction is performed in the two-dimensional force sensor shown in FIG. 19. It is to be noted that the part of the dome-shaped structure 30 shown herein is not a section but a side. Additionally, only the cross section of each of the pillar-shaped projections P1 to P3 is shown, and the far inner part of each pillar-shaped projection is omitted.

When an operational force Fx– (or FFx–, and so forth) by which the operating panel 10 is inclined leftward as shown in FIG. 21 is entered, the supporting pillar-shaped projections P1 and P3 in the left half of the figure are elastically deformed and collapse longitudinally. On the other hand, the supporting pillar-shaped projections P1 and P3 in the right half of the figure are raised from the upper surface of the substrate 40 as shown in the figure. In effect, when an operational force Fx− larger than a predetermined force is applied, the lower end surface (i.e., displacement conductive layer that functions as an intermediary electrode) of the contacting pillar-shaped projection P2 disposed at the left end of the figure is brought into contact with both of the outer electrodes E15 and E16 as shown in FIG. 21, so that the outer electrodes E15 and E16 reach an electrically conductive state, and the whole of the displacement conductive layer 26 becomes equal in electric potential to the outer electrodes E15 and E16. If the operational force Fx− is further strengthened from this state, the supporting pillar-shaped projections P1 and P3 in the left half of the figure are further elastically deformed as if to be crushed as shown in FIG. 22, and, likewise, the contacting pillar-shaped projection P2 is slightly elastically deformed and collapses. Finally, the supporting pillar-shaped projections P1, P3, and the contacting pillar-shaped projection P2 that are disposed at the left of the figure completely collapse as shown in FIG. 23. As already described, since all of the intermediate electrodes E11 to E14 have their surfaces covered with the insulating layer, they still function as a capacitance element because the insulating layer lies between the two electrodes even if the displacement conductive layer 26 comes in close contact with the side of the intermediate electrode E12 as shown in FIG. 23.

Consideration will now be given to a change in the electrostatic capacitance value of the capacitance element made up of the intermediate electrodes E11 to E14 and the displacement conductive layer 26 facing them when the state of FIG. 19 is changed to the states of FIG. 21, FIG. 22, and FIG. 23. In the second capacitance element C12 made up of the intermediate electrode E12 shown at the left of the figure and the displacement conductive layer 26 facing this, it can be understood that the distance between the electrodes gradually decreases, and therefore the electrostatic capacitance value gradually increases, whereas in the first capacitance element C11 made up of the intermediate electrode E11 shown at the right of the figure and the displacement conductive layer 26 facing this, it can be understood that the distance between the electrodes gradually increases, and therefore the electrostatic capacitance value gradually decreases. Therefore, if a difference is calculated between the electrostatic capacitance value of the first capacitance element C11 and the electrostatic capacitance value of the second capacitance element C12 disposed on the X-axis, this difference will indicate the magnitude of the operational force Fx−. In contrast, when an operational force Fx+ is applied in the X-axis positive direction, the operating panel 10 is inclined rightward, and the increase-decrease relationship of the distance between the electrodes is reversed. As a result, the magnitude of the operational force Fx+ is indicated by a difference between the electrostatic capacitance value of the first capacitance element C11 and the electrostatic capacitance value of the second capacitance element C12. In brief, the absolute value of the difference between the electrostatic capacitance value of the first capacitance element C11 disposed on the X axis (capacitance element made up of the intermediate electrode E11 and the displacement conductive layer 26) and the electrostatic capacitance value of the second capacitance element C12 (capacitance element made up of the intermediate electrode E12 and the displacement conductive layer 26) indicates the magnitude of an operation quantity applied as the operational force Fx− or Fx+ in the X-axis direction, and its sign indicates the direction of the operation quantity that has been applied (i.e., X-axis positive direction or X-axis negative direction).

According to exactly the same principle, if a difference is calculated between the electrostatic capacitance value of the third capacitance element C13 (capacitance element made up of the intermediate electrode E13 and the displacement conductive layer 26) and the electrostatic capacitance value of the fourth capacitance element C14 (capacitance element made up of the intermediate electrode E14 and the displacement conductive layer 26) disposed on the Y-axis, the absolute value of this difference will indicate the magnitude of an operation quantity applied as the operational force Fy− or Fy+ in the Y-axis direction, and its sign will indicate the direction of the operation quantity that has been applied (i.e., Y-axis positive direction or Y-axis negative direction).

If only the operational force in the X-axis direction is applied, the operating panel 10 is inclined only in the X-axis direction and is not inclined in the Y-axis direction. Therefore, in the electrode distance between the third capacitance element C13 and the fourth capacitance element disposed on the Y-axis, a part thereof increases, and a part thereof decreases. The entire capacitance element does not cause a change in the electrostatic capacitance value. Likewise, if only the operational force in the Y-axis direction is applied, the operating panel 10 is inclined only in the Y-axis direction and is not inclined in the X-axis direction. Therefore, in the electrode distance between the first capacitance element and the second capacitance element disposed on the X-axis, a part thereof increases, and a part thereof decreases. The entire capacitance element does not cause a change in the electrostatic capacitance value. In effect, only the operation quantity in the X-axis direction can be detected by the first and second capacitance elements, and only the operation quantity in the Y-axis direction can be detected by the third and fourth capacitance elements, thus making it possible to detect an operation quantity component in each direction independently of each other.

An operation quantity that has been input can be detected by measuring the electrostatic capacitance value of the four sets of capacitance elements in this way. A contrivance by which the detection value of such an operation quantity is not carelessly output is employed for the device according to this embodiment. In an input device using the elastic deformable body 20, elastic deformation arises in the elastic deformable body 20 even when a very weak force is applied to the operating panel 10, and a change occurs in the electrostatic capacitance value of each capacitance element. For example, FIG. 20 shows the state of applying a downward pressing force Fz− in the figure in order for the operator to perform a click operation. If only a pressing force Fz− that has been thus applied exactly downward functions, the electrostatic capacitance values of the four sets of capacitance elements will be equally changed. Therefore, if the difference is detected as mentioned above, the detection value of the operation quantity in a predetermined direction becomes equal to zero. However, it is a human being that operates the operating panel 10 in actuality, and, even if a force is applied aiming to perform a downward click operation, the applied pressing force will contain not only a Z-axis negative direction component but also an X-axis or Y-axis direction component. Therefore, if differential detection is performed using the four sets of capacitance elements, an operation quantity in any direction will be detected merely by allowing the operator to perform a click operation.

Generally, it is preferable for the input device to detect a switch input (click input) that indicates an ON/OFF state and operational input that indicates an operation quantity in a predetermined direction independently of each other without interference with each other. In other words, preferably, when the operator pushes the operating panel 10 vertically downward with the intention of performing a click operation, only the switch input by which a change occurs from an OFF state to an ON state is detected, and the operational input that indicates an operation quantity in a predetermined direction is never detected. In contrast, when the operator pushes the operating panel 10 diagonally downward with the intention of performing the operational input that indicates an operation quantity in a predetermined direction, the switch input is never detected, and only the operation quantity is detected. In the two-dimensional force sensor according to this embodiment, these two kinds of inputting acts can be detected independently of each other, and interference therebetween can be avoided as much as possible.

First, concerning the switch input, only when a vertically downward pressing force Fz− large enough to bring about a shape reversal of a part around the vertex of the dome-shaped structure 30 is applied, an ON state is detected, and therefore it is possible to avoid a situation in which an ON state of switch input is detected by mistake in spite of the fact that the operator has targeted to give operational input that indicates an operation quantity in a predetermined direction. For example, even when a diagonally downward operational input is applied as shown in FIG. 21 to FIG. 23, a vertically downward pressing force applied to the vertex part of the dome-shaped structure 30 is insufficient to cause its shape reversal. Therefore, in the switch input, an ON state is never detected (both two kinds of inputting actions are detected, of course, when the operator intentionally performs a pressing operation combining the click input and the operational input in a predetermined direction).

On the other hand, concerning the operational input that indicates an operation quantity in a predetermined direction, the electrostatic capacitance value of the four sets of capacitance elements varies as mentioned above, but a variation in this electrostatic capacitance value is designed not to be output as a detection value in its entirety. A possible way to obtain the output of the detection value by using this design is to measure the electrostatic capacitance value of each capacitance element using the outer electrodes El5 and E16. For example, theoretically, the electrostatic capacitance value of the second capacitance element C12 can be obtained by measuring the electrostatic capacitance value between the intermediate electrode E12 and the displacement conductive layer 26 according to an electric method. However, instead, the value is obtained by measuring the electrostatic capacitance value between the intermediate electrode E12 and the outer electrode El5 or E16 according to an electric method. In brief, concerning the electrodes shown in FIG. 17, the following method should be employed. That is, an electrostatic-capacitance measured value between the intermediate electrode E11 and the outer electrode El5 or E16 is used as a detection value of the electrostatic capacitance value of the first capacitance element C11, an electrostatic-capacitance measured value between the intermediate electrode E12 and the outer electrode E15 or E16 is used as a detection value of the electrostatic capacitance value of the second capacitance element C12, an electrostatic-capacitance measured value between the intermediate electrode E13 and the outer electrode E15 or E16 is used as a detection value of the electrostatic capacitance value of the third capacitance element C13, and an electrostatic-capacitance measured value between the intermediate electrode E14 and the outer electrode E15 or E16 is used as a detection value of the electrostatic capacitance value of the fourth capacitance element C14.

By employing this detection method, an actual detection value of the electrostatic capacitance of each capacitance element is output under the condition that the displacement conductive layer 26 is in electrical contact with the outer electrode E15 or E16. For example, since the displacement conductive layer 26 is not in contact with the outer electrodes E15 and E16 in the state of FIG. 19 or FIG. 20, the differential detection value of the pair of capacitance elements is still zero. Therefore, an operation quantity in a predetermined direction is never detected by mistake when the operator performs switch input. An operation quantity in a predetermined direction is not output as a detection value by the differential detection of the pair of capacitance elements until some degree of operation quantity is applied so that a part of the displacement conductive layer 26 formed on the undersurface of the contacting pillar-shaped projection P2 comes into contact with the outer electrode E15 or E16 as shown in FIG. 21. A sort of dead zone exists until they come into contact, and the differential detection value to be output is still zero. In this embodiment, as shown in FIG. 13, sixteen contacting pillar-shaped projections P2 in total are formed on the circumference of the basic concentric circle C2, and a displacement conductive layer is formed on the undersurface of the contacting pillar-shaped projection P2. Therefore, when any one of the displacement conductive layers formed on the undersurface of the sixteen contacting pillar-shaped projections P2 is brought into contact with the outer electrodes E15 and E16, a significant differential detection value is output.

In effect, in the two-dimensional force sensor according to this embodiment, when the downward switch input is applied to the operating panel 10, the dome-shaped structure 30 causes a shape reversal, and the conductive contact surface 31 comes into contact with the inner electrode E17, thus allowing the pair of inner electrodes E17 and E18 to reach an electrically conductive state. An ON/OFF state is detected by electrically detecting this conductive state. When operational input greater than a predetermined force indicating an operation quantity in a predetermined direction is applied to the operating panel 10, the operation quantity that has been applied is detected by calculating the electrostatic capacitance value of each capacitance element based on the electric characteristic between the outer electrode E15 or E16 and each of the intermediate electrodes E11 to E14.

Constituent elements assuming an important role in this detecting operation are the supporting pillar-shaped projections P1 and P3 supporting the film part of the elastic deformable body 20 and the contacting pillar-shaped projection P2 forming a contact part with the outer electrodes E15 and E16. Since the pillar-shaped projections are each made of elastic material, the projections are elastically deformed by the action of the force applied onto the operating panel 10, and the amount of its deformation varies correspondingly with the applied force. The distance between a specific portion of the film part and the upper surface of the substrate 40 is reduced by the deformation of the pillar-shaped projections. When the magnitude of the applied force exceeds a predetermined value, a part of the displacement conductive layer 26 comes into contact with the outer electrodes E15 and E16, and the electrostatic capacitance value of each capacitance element is measured as an electric characteristic between the outer electrodes E15 and E16 and each of the intermediate electrodes E11 to E14, and is output as a given detection value. Moreover, since the electrode distance of the capacitance elements varies proportionately to the degree of the operation quantity applied thereto, it becomes possible to output a detection value proportionate to the degree of the operation quantity.

A feature of this embodiment lies in the fact that the film part of the elastic deformable body 20 is structured to be supported by the supporting pillar-shaped projections P1 and P3, contributing greatly to thinning the entire device. In greater detail, the film part is restrained from displacement because of the supporting function of the projections P1 and P3 as long as a force larger than a predetermined value is not applied to the operating panel 10. Therefore, even if the entire elastic deformable body 20 is designed to be considerably thin, the displacement conductive layer 26 and the outer electrodes E15 and E16 can be prevented from coming into contact with each other by mistake because of the weight of the film part or because of a force other than the normal operational input.

In order to electrically detect an electrostatic capacitance value C of a capacitance element, the force sensor using the capacitance element may be required to have a C/V conversion circuit for converting an electrostatic capacitance value C into a voltage value V or a C/f conversion circuit for converting an electrostatic capacitance value C into a frequency f. A conventional C/V conversion circuit or C/f conversion circuit includes an oscillating circuit and has a problem in the fact that electric power consumption during operation becomes relatively large. The two-dimensional force sensor constructed as mentioned above can stop the function of a detector circuit that detects the electrostatic capacitance value of the capacitance element as an electrical signal and can save power consumption when there is no need to detect operational input. Concretely, a circuit large in power consumption, such as the C/V conversion circuit or the C/f conversion circuit, which is built into the detector circuit should be run only when detection output is needed.

The two-dimensional force sensor uses the four sets of capacitance elements in total, i.e., the two sets of capacitance elements C11 and C12 disposed on the X-axis and the two sets of capacitance elements C13 and C14 disposed on the Y-axis. Operational input in the four directions applied to the operating panel 10 is detected by these capacitance elements. That is, operational input in the X-axis positive or negative direction is detected by a difference between the electrostatic capacitance values of the two sets of capacitance elements C11 and C12 disposed on the X-axis, whereas operational input in the Y-axis positive or negative direction is detected by a difference between the electrostatic capacitance values of the two sets of capacitance elements C13 and C14 disposed on the Y-axis.

Figure 24:
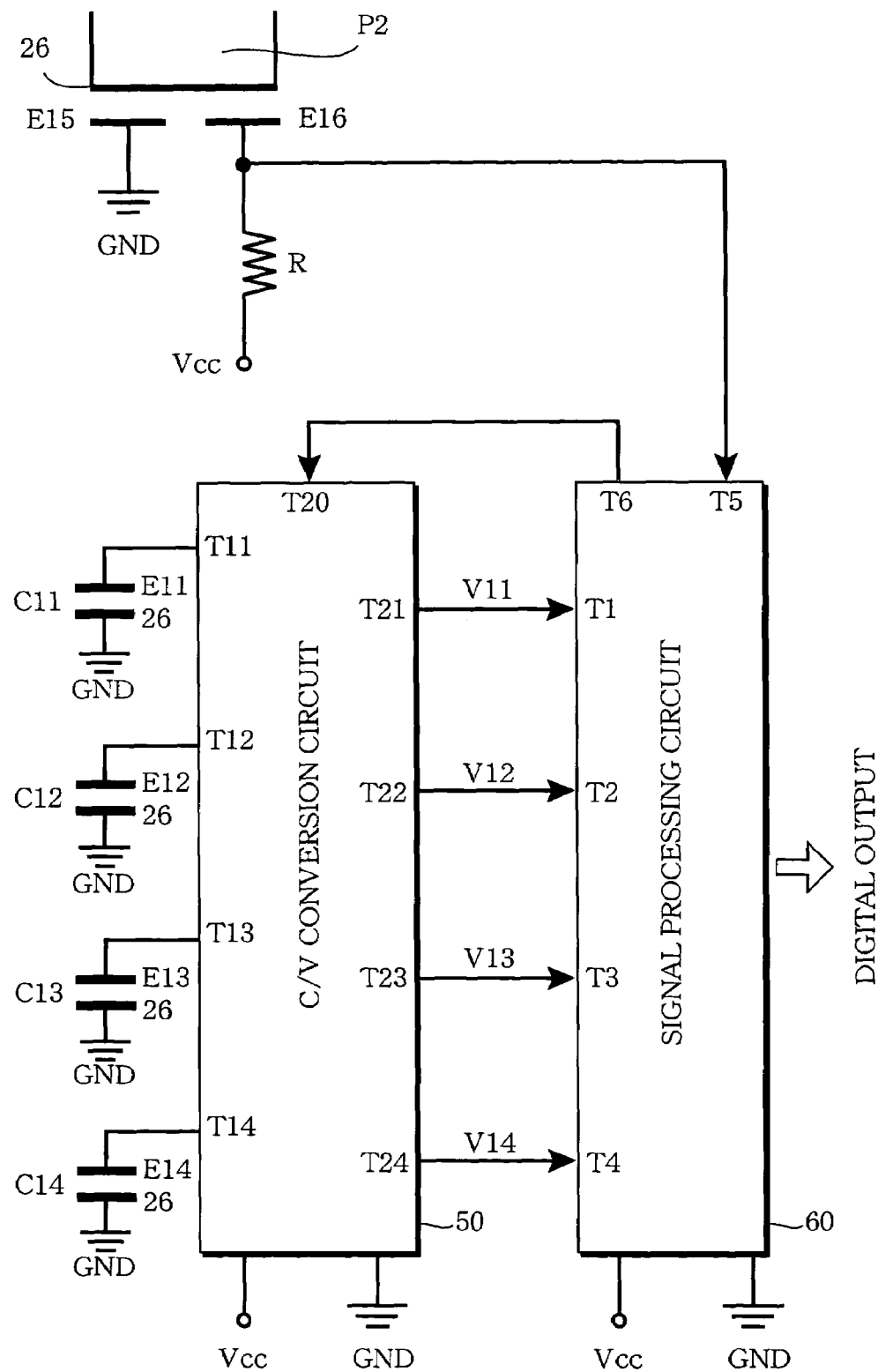
FIG. 24 is a circuit diagram showing an example of a detector circuit used in the two-dimensional force sensor shown in FIG. 19.

FIG. 24 is a circuit diagram showing one example of the detector circuit that detects the operational input in the four directions based on the electrostatic capacitance values of the four sets of capacitance elements C11 to C14. Basic constituent elements of the detector circuit are a C/V conversion circuit 50 and a signal processing circuit 60. Each circuit has a terminal used to supply a power source Vcc and a terminal used for grounding. The C/V conversion circuit 50 functions to convert the electrostatic capacitance values of the four sets of capacitance elements C11 to C14 into analog voltage values V11 to V14, respectively, and output them. The signal processing circuit 60 first converts the analog voltage values V11 to V14 into digital values, and then defines a difference between the voltage values V11 and V12 as an operational input value in the X-axis positive or negative direction, and defines a difference between the voltage values V13 and V14 as an operational input value in the Y-axis positive or negative direction.

As already described, the two-dimensional force sensor is provided with a dead zone, and is designed so that a variation in the electrostatic capacitance value cannot be output as a detection value in its entirety until the operational input applied to the operating panel 10 exceeds a predetermined value. For example, originally, the electrostatic capacitance value of the second capacitance element C12 is to be obtained by measuring an electrostatic capacitance value between the intermediate electrode E12 and the displacement conductive layer 26 according to an electric method. However, instead, use is made of a method of electrically measuring an electrostatic capacitance value between the intermediate electrode E12 and the outer electrode E15 (or E16). That is, the operational input in the X-axis negative direction is not detected as effective input until some degree of operation quantity is applied so that a part of the displacement conductive layer 26 formed on the undersurface of the contacting pillar-shaped projection P2 comes into contact with the outer electrodes E15 and E16 as shown in FIG. 21. The dead zone exists until they come into contact with each other.

The pair of outer electrodes E15 and E16 (contacting electrodes) formed on the substrate 40 and a part of the displacement conductive layer 26 (intermediary electrode) formed on the undersurface of the contacting pillar-shaped projection P2 are schematically shown at the upper left of FIG. 24. In this example, the outermost electrode E15 is grounded, and the outer electrode E16 disposed inside the electrode E15 is connected to the power supply voltage Vcc through a resistor R. On the other hand, the displacement conductive layer 26 forms a single conductive layer made in the hatched region of FIG. 14, but does not have a wiring connection to other parts, being electrically isolated. In the circuit diagram of FIG. 24, the one-side electrodes (displacement conductive layer 26) that constitute the capacitance elements C11 to C14 connected to the input stage of the C/V conversion circuit 50 are depicted in the state of being all grounded. The reason is that, in this force detector, the electrostatic capacitance values of the capacitance elements C11 to C14 are detected under the precondition that a part of the displacement conductive layer 26 formed on the undersurface of the contacting pillar-shaped projection P2 is in contact with the outer electrodes E15 and E16 as shown in FIG. 21, and, at this point in time, the electric potential of the displacement conductive layer 26 is equal to a grounding level through the outer electrode E15. In other words, the displacement conductive layer 26, which is the one-side electrode of each of the capacitance elements C11 to C14, is in an electrically floating state, and the detector circuit shown in the figure cannot detect the electrostatic capacitance value until a part of the displacement conductive layer 26 comes into contact with the outer electrodes E15 and E16.

Therefore, if the C/V conversion circuit 50 is set to be always working, electric power will be wastefully consumed. Since the detector circuit shown in FIG. 24 cannot fulfill its own function if the displacement conductive layer 26 is not connected to the grounding level through the outer electrode E15, there is no point in keeping the C/V conversion circuit 50 working. Therefore, a switch element is provided so that the C/V conversion circuit 50 can work only when needed. In this embodiment, the switch element is made up of the outer electrodes E15 and E16 (pair of contacting electrodes) and the displacement conductive layer 26 (intermediary electrode). In a normal state (state of FIG. 19) in which the operator is not performing operational input to the operating panel 10, the displacement conductive layer 26 is in a non-contact state with the outer electrodes E15 and E16. In this non-contact state, the electric potential of the outer electrode E16 becomes equal to that of the power supply voltage Vcc connected thereto through the resistor R. However, when the operator applies operational input exceeding a predetermined value to the operating panel 10, the displacement conductive layer 26 reaches the state of being in contact with both of the outer electrodes E15 and E16 simultaneously as shown in FIG. 21, for example. In this contact state, the electric potential of the outer electrode E16 falls to the grounding level so as to be electrically connected to the outer electrode E15. In effect, based on the electric potential of the outer electrode E16, recognition can be obtained as to whether the pair of contacting electrodes El5 and E16 are in an insulating state (i.e., the displacement conductive layer 26 is in a non-contact state) or in an electrically conductive state (i.e., the displacement conductive layer 26 is in a contact state).

The detector circuit (the C/V conversion circuit 50 and the signal processing circuit 60) shown in FIG. 24 has two modes. A first mode is a detection mode capable of fulfilling a detecting function to detect the electrostatic capacitance value of the capacitance elements C11 to C14 as an electric signal, and a second mode is a standby mode capable of maintaining a standby state to shift to the detection mode with power consumption smaller than that of the detection mode although the detecting function cannot be performed. Either of the two modes is selected based on an electric state between the pair of contacting electrodes (outer electrodes El5 and E16) constituting the switch element. That is, when an electric state between the pair of contacting electrodes is an insulating state, the standby mode is selected, and, when it is an electrically conductive state, the detection mode is selected. In greater detail, the C/V conversion circuit 50 among the detector circuits shown in FIG. 24 has a function to work according to the two modes. The mode according to which the circuit 50 works is determined by a control signal given to a control terminal T20. This control signal is generated by the signal processing circuit 60. The electric potential of the outer electrode E16 is input to a terminal T5 of the signal processing circuit 60. The signal processing circuit 60 functions to output a predetermined control signal from a terminal T6 based on this electric potential and sends it to the control terminal T20 of the C/V conversion circuit 50. That is, the signal processing circuit 60 outputs a control signal that specifies the standby mode from the terminal T6 when the electric potential of the outer electrode E16 is the power supply voltage Vcc, whereas the circuit 60 outputs a control signal that specifies the detection mode from the terminal T6 when the electric potential of the outer electrode E16 is the grounding level.

In effect, the C/V conversion circuit 50 works according to the standby mode having less power consumption until the displacement conductive layer 26 comes into contact with both of the outer electrodes E15 and E16, and works according to the detection mode as long as the displacement conductive layer 26 is in contact with both of the outer electrodes El5 and E16. In other words, significant voltage values V11 to V14 are output from the C/V conversion circuit 50 only when the operator intentionally applies operational input exceeding a predetermined magnitude in the X-axis or the Y-axis direction, and significant digital output can be obtained from the signal processing circuit 60. Power consumption can be greatly reduced as a whole by thus allowing the C/V conversion circuit 50 having large power consumption to selectively work only for a necessary period.

The foregoing description has been provided for one example of the two-dimensional force sensor suitable for use in the rotational-operation-quantity input device of the present invention. However, the structure of the two-dimensional force sensor usable in the present invention is not limited to the example shown here. Any kind of sensor can be used as long as it is a force sensor that can detect an operational force in the X-axis direction and an operational force in the Y-axis direction applied by the operator independently of each other. For example, although the aforementioned sensor is the sort of force sensor that obtains a detection value by the use of capacitance elements, it is possible to employ the sort of sensor that uses a piezoelectric element or a piezoresistance element. Additionally, although the aforementioned sensor is constructed so that the operational force of the operator acts on the disk-like operating panel 10, the sensor can be constructed so that, keeping a straight operation rod extending in the Z-axis direction, an operational force by which this operation rod is inclined in the X-axis and Y-axis directions by a predetermined quantity is applied (so-called joystick type force sensor).

As described above, according to the present invention, it is possible to realize an efficient rotational-operation-quantity input device suitable to be built into a small electrical appliance.

What is claimed is:

1. A rotational-operation-quantity input device for inputting an operation quantity indicating a predetermined rotation angle, comprising:

a two-dimensional force sensor for inputting an operational force applied by an operator in time series as coordinate values (x, y) in an XY two-dimensional rectangular coordinate system;

a polar-coordinate converting section for sequentially converting the coordinate values (x, y) in the rectangular coordinate system given in time series into polar coordinate values (r, θ) in a polar coordinate system; and an operation-quantity recognizing section for recognizing a variation in a value θ of the polar coordinate values (r, θ) obtained in time series as an operation quantity indicating a rotation angle;

wherein said two-dimensional force sensor includes a substrate having an upper surface on which said XY two-dimensional rectangular coordinate system with an X-axis and a Y-axis intersecting on said upper surface is defined, a group of detection electrodes fixed on said upper surface, a pair of outer electrodes fixed on said upper surface and disposed on an area outside of an area on which said detection electrodes are fixed, an elastic deformable body disposed on said substrate so as to cover said detection electrodes and said pair of outer electrodes, displacement conductive layers formed on a lower surface of said elastic deformable body so as to oppose said detection electrodes and said pair of outer electrodes, a group of capacitance elements being formed between said detection electrodes and respective opposing displacement conductive layers, an operating panel disposed on an upper surface of said elastic deformable body, said operating panel can be inclined by said operational force so as to change capacitance values of said capacitance elements, and a detection circuit for detecting said coordinate values (x, y) based on capacitance values of said detection capacitance elements as long as a displacement conductive layer is in contact with both of said pair of outer electrodes.

2. The rotational-operation-quantity input device as set forth in claim 1, wherein the operation-quantity recognizing section recognizes the polar coordinate values (r, θ) as a significant coordinate value when value r of the polar coordinate value (r, θ) is larger than a predetermined threshold rt, and recognizes an operation quantity based on a variation in a value θ in consideration of only a significant coordinate value (r, θ).

3. The rotational-operation-quantity input device as set forth in claim 2, wherein the operation-quantity recognizing section recognizes an operation quantity based on a variation in value θ during a continuous period when a significant coordinate value (r, θ) is obtained continuously.

4. The rotational-operation-quantity input device as set forth in claim 3, wherein, when a value θ generates a variation Δθ exceeding a predetermined threshold θt with respect to a value "θ before" immediately before a period during which a significant coordinate value (r, θ) is obtained continuously, the operation-quantity recognizing section recognizes a value corresponding to the variation Δθ as an operation quantity.

5. An operating device including the input device as set forth in claim 1, having an operational function to specify an icon, comprising:
   icon display means for annularly displaying a plurality of icons on a display screen;
   distinguishing means for displaying an indicator to distinguish a specified icon on the display screen by receiving an instruction to specify one of the plurality of icons;
   initial-icon specifying means for specifying any one of the plurality of icons as a first specified icon; and
   specified-icon changing means for giving an instruction to change the specified icon into a new icon disposed at a position having an interval corresponding to an operation quantity recognized by the operation-quantity recognizing section of the input device.

6. An operating device including the input device as set forth in claim 1, being used for volume control or for forwarding/rewinding control in reproducing sound, comprising:
   rotation knob display means for displaying a rotation knob used to perform a volume control operation or a forwarding/rewinding control operation in reproducing sound on the display screen; and
   control means for determining a rotation quantity of the rotation knob correspondingly with an operation quantity recognized by the operation-quantity recognizing section of the input device and causing the rotation knob display means to perform a display corresponding to the rotation quantity while performing volume control or forwarding/rewinding control correspondingly with the rotation quantity.

7. An operating device including the input device as set forth in claim 1, being used for frame feed in reproducing moving image, comprising:
   rotation knob display means for displaying a rotation knob used to perform a frame feed operation in reproducing moving image on the display screen; and
   control means for determining a number of frames to be fed correspondingly with an operation quantity recognized by the operation-quantity recognizing section of the input device and causing the rotation knob display means to perform a display indicating a rotational operation corresponding to the number of frames.

8. The rotational operation quantity input device as set forth in claim 1, wherein displacement conductive layers opposing the detection electrodes and the pair of outer electrodes are made of a physically integrated single layer.

9. The rotational-operation-quantity input device as set forth in claim 8, wherein the operation-quantity recognizing section recognizes the polar coordinate values (r, θ) as a significant coordinate value when value r of the polar coordinate values (r, θ) is larger than a predetermined threshold rt, and recognizes an operation quantity based on a variation in a value θ in consideration of only the significant coordinate value (r, θ).

10. The rotational-operation-quantity input device as set forth in claim 9, wherein the operation-quantity recognizing section recognizes an operation quantity based on a variation in value θ during a continuous period when a significant coordinate value (r, θ) is obtained continuously.

11. The rotational-operation-quantity input device as set forth in claim 10, wherein, when a value θ generates a variation Δθ exceeding a predetermined threshold θt with respect to a value "θ before" immediately before a period during which a significant coordinate value (r, θ) is obtained continuously, the operation-quantity recognizing section recognizes a value corresponding to the variation Δθ as an operation quantity.

12. An operating device including the input device as set forth in claim 8, having an operational function to specify an icon, comprising:
   icon display means for annularly displaying a plurality of icons on a display screen;
   distinguishing means for displaying an indicator to distinguish a specified icon on the display screen by receiving an instruction to specify one of the plurality of icons;
   initial-icon specifying means for specifying any one of the plurality of icons as a first specified icon; and
   specified-icon changing means for giving an instruction to change the specified icon into a new icon disposed at a position having an interval corresponding to an operation quantity recognized by the operation-quantity recognizing section of the input device.

13. An operating device including the input device as set forth in claim 8, being used for volume control or for forwarding/rewinding control in reproducing sound, comprising:
   rotation knob display means for displaying a rotation knob used to perform a volume control operation or a forwarding/rewinding control operation in reproducing sound on the display screen; and
   control means for determining a rotation quantity of the rotation knob correspondingly with an operation quantity recognized by the operation-quantity recognizing section of the input device and causing the rotation knob display means to perform a display corresponding to the rotation quantity while performing volume control or forwarding/rewinding control correspondingly with the rotation quantity.

14. An operating device including the input device as set forth in claim 8, being used for frame feed in reproducing moving image, comprising:
   rotation knob display means for displaying a rotation knob used to perform a frame feed operation in reproducing moving image on the display screen; and
   control means for determining a number of frames to be fed correspondingly with an operation quantity recognized by the operation-quantity recognizing section of the input device and causing the rotation knob display means to perform a display indicating a rotational operation corresponding to the number of frames.

15. A rotational-operation-quantity input device for inputting an operation quantity indicating a predetermined rotation angle, comprising:
- a two-dimensional force sensor for inputting an operational force applied by an operator in time series as coordinate values (x, y) in an XY two-dimensional rectangular coordinate system;
- a polar-coordinate converting section for sequentially converting the coordinate values (x, y) in the rectangular coordinate system given in time series into polar coordinate values (r, θ) in a polar coordinate system; and
- an operation-quantity recognizing section for recognizing a variation in a value θ of the polar coordinate values (r, θ) obtained in time series as an operation quantity indicating a rotation angle;

wherein said two-dimensional force sensor includes a substrate having an upper surface on which said XY two-dimensional rectangular coordinate system with an X-axis and a Y-axis intersecting on said upper surface is defined, a first electrode, a second electrode, a third electrode and a fourth electrode fixed on said upper surface, said first electrode being disposed on a positive area of said X-axis, said second electrode being disposed on a negative area of said X-axis, said third electrode being disposed on a positive area of said Y axis and said fourth electrode being disposed on a negative area of said Y axis, a pair of outer electrodes fixed on said upper surface and disposed around said first to fourth electrodes, an elastic deformable body disposed on said substrate so as to cover said first to fourth electrodes and said pair of outer electrodes, a displacement conductive layer formed on a lower surface of said elastic deformable body so as to oppose said first to fourth electrodes and said pair of outer electrodes, a first capacitance element being formed between said first electrode and an opposing part of said displacement conductive layer, a second capacitance element being formed between said second electrode and an opposing part of said displacement conductive layer, a third capacitance element being formed between said third electrode and an opposing part of said displacement conductive layer and a fourth capacitance element being formed between said fourth electrode and an opposing part of said displacement conductive layer, an operating panel disposed on an upper surface of said elastic deformable body, said operating panel can be inclined by said operational force in said X axis direction and said Y axis direction with respect to said substrate, wherein an inclination in said X axis direction of said operating panel changes capacitance values of said first capacitance element and said second capacitance element and an inclination in said Y axis direction of said operating panel changes capacitance values of said third capacitance element and said fourth capacitance element, and a detection circuit for detecting a coordinate value x based on capacitance values of said first capacitance element and said second capacitance element and a coordinate valve y based on capacitance values of said third capacitance element and said fourth capacitance element as long as said displacement conductive layer is in contact with both of said pair of outer electrodes.

16. The rotational-operation-quantity input device as set forth in claim 15, wherein the operation-quantity recognizing section recognizes the polar coordinate values (r, θ) as a significant coordinate value when value r of the polar coordinate values (r, θ) is larger than a predetermined threshold rt, and recognizes an operation quantity based on a variation in a value θ in consideration of only a significant coordinate value (r, θ).

17. The rotational-operation-quantity input device as set forth in claim 16, wherein the operation-quantity recognizing section recognizes an operation quantity based on a variation in value θ during a continuous period when a significant coordinate value (r, θ) is obtained continuously.

18. The rotational-operation-quantity input device as set forth in claim 17, wherein, when a value θ generates a variation Δθ exceeding a predetermined threshold θt with respect to a value "θ before" immediately before a period during which a significant coordinate value (r, θ) is obtained continuously, the operation-quantity recognizing section recognizes a value corresponding to the variation Δθ as an operation quantity.

19. An operating device including the input device as set forth in claim 15, having an operational function to specify an icon, comprising:
- icon display means for annularly displaying a plurality of icons on a display screen;
- distinguishing means for displaying an indicator to distinguish a specified icon on the display screen by receiving an instruction to specify one of the plurality of icons;
- initial-icon specifying means for specifying any one of the plurality of icons as a first specified icon; and
- specified-icon changing means for giving an instruction to change the specified icon into a new icon disposed at a position having an interval corresponding to an operation quantity recognized by the operation-quantity recognizing section of the input device.

20. An operating device including the input device as set forth in claim 15, being used for volume control or for forwarding/rewinding control in reproducing sound, comprising:
- rotation knob display means for displaying a rotation knob used to perform a volume control operation or a forwarding/rewinding control operation in reproducing sound on the display screen; and
- control means for determining a rotation quantity of the rotation knob correspondingly with an operation quantity recognized by the operation-quantity recognizing section of the input device and causing the rotation knob display means to perform a display corresponding to the rotation quantity while performing volume control or forwarding/rewinding control correspondingly with the rotation quantity.

21. An operating device including the input device as set forth in claim 15, being used for frame feed in reproducing moving image, comprising:
- rotation knob display means for displaying a rotation knob used to perform a frame feed operation in reproducing moving image on the display screen; and
- control means for determining a number of frames to be fed correspondingly with an operation quantity recognized by the operation-quantity recognizing section of the input device and causing the rotation knob display means to perform a display indicating a rotational operation corresponding to the number of frames.

* * * * *